(12) United States Patent
Kellerman

(10) Patent No.: US 9,939,102 B2
(45) Date of Patent: Apr. 10, 2018

(54) WATERFALL-TYPE CABLE ROUTER

(71) Applicant: Cablofil, Inc., Mascoutah, IL (US)

(72) Inventor: Dallas Kellerman, Belleville, IL (US)

(73) Assignee: CABLOFIL, INC., Mascoutah, IL (US)

( * ) Notice: Subject to any disclaimer, the term of this patent is extended or adjusted under 35 U.S.C. 154(b) by 0 days.

(21) Appl. No.: 14/753,977

(22) Filed: Jun. 29, 2015

(65) Prior Publication Data

US 2015/0380918 A1    Dec. 31, 2015

Related U.S. Application Data

(60) Provisional application No. 62/017,904, filed on Jun. 27, 2014, provisional application No. 62/031,473, filed on Jul. 31, 2014.

(51) Int. Cl.
*H02G 3/04* (2006.01)
*F16M 13/02* (2006.01)

(52) U.S. Cl.
CPC ............ *F16M 13/02* (2013.01); *H02G 3/045* (2013.01); *H02G 3/0443* (2013.01)

(58) Field of Classification Search
CPC ....... H02G 3/0443; H02G 3/22; G02B 6/4478
See application file for complete search history.

(56) References Cited

U.S. PATENT DOCUMENTS

| | | | | |
|---|---|---|---|---|
| 2,656,998 A | * | 10/1953 | Ullberg, Jr. .......... | H02G 3/0443 193/41 |
| 5,937,131 A | * | 8/1999 | Haataja ................ | G02B 6/4459 385/134 |
| 6,037,543 A | * | 3/2000 | Nicoli .................. | H02G 3/0608 138/157 |
| 6,522,823 B1 | * | 2/2003 | Wentworth .......... | G02B 6/4459 385/134 |
| 6,586,680 B1 | * | 7/2003 | Nelson ................. | G02B 6/4478 174/135 |
| 7,184,644 B2 | | 2/2007 | Johnson et al. | |
| 7,470,859 B1 | | 12/2008 | Gretz | |
| 7,601,922 B2 | * | 10/2009 | Larsen ..................... | F16L 3/26 174/481 |

(Continued)

FOREIGN PATENT DOCUMENTS

WO    2015200910    12/2015

OTHER PUBLICATIONS

Patent Cooperation Treaty, International Search Report for PCT/US2015/038327, dated Sep. 30, 2015 3 pages.

(Continued)

*Primary Examiner* — Bradley Duckworth
(74) *Attorney, Agent, or Firm* — Bryan Cave LLP

(57) ABSTRACT

A waterfall-type cable router for routing cables out of cable trays including a floor having a front side, a rear side, a left side, and a right side, wherein at least a portion of the floor is substantially horizontal. A vertical rear wall extends along the rear side of the floor. The cable router further includes a left ramp extending downward from the left side of the floor, a right ramp extending downward from the right side of the floor, and a front ramp extending downward from the front side of the floor. A vertical left curved wall extends between the left ramp and the front ramp, and a vertical right curved wall extends between the right ramp and the front ramp.

27 Claims, 38 Drawing Sheets

(56) References Cited

U.S. PATENT DOCUMENTS

| | | | | |
|---|---|---|---|---|
| 7,693,386 B2* | 4/2010 | Waszak | ............... | G02B 6/4459 |
| | | | | 211/26 |
| 8,263,863 B2* | 9/2012 | Young | ................. | H02G 3/0443 |
| | | | | 174/135 |
| 8,315,069 B2* | 11/2012 | Caveney | ............. | H02G 3/0608 |
| | | | | 361/826 |
| 8,319,120 B2* | 11/2012 | Caveney | ............. | G02B 6/4459 |
| | | | | 174/101 |
| 8,502,071 B2* | 8/2013 | Caveney | ................. | H02G 3/22 |
| | | | | 174/100 |
| 9,184,578 B2* | 11/2015 | Winn | ................... | H02G 3/0443 |
| 9,466,959 B2* | 10/2016 | Larsen | ................... | H02G 3/045 |
| 2004/0065459 A1 | 4/2004 | Spagnoli et al. | | |
| 2004/0201975 A1 | 10/2004 | Bravo et al. | | |
| 2008/0023212 A1* | 1/2008 | Larsen | ................. | H02G 3/0443 |
| | | | | 174/101 |
| 2010/0038496 A1* | 2/2010 | Sjoqvist | .............. | H02G 3/0443 |
| | | | | 248/73 |
| 2010/0230551 A1 | 9/2010 | Kellerman | | |
| 2011/0286785 A1 | 11/2011 | Brouwer et al. | | |
| 2012/0211609 A1* | 8/2012 | Mandic | ............... | H02G 3/0443 |
| | | | | 248/65 |
| 2012/0223192 A1 | 9/2012 | Donaldson et al. | | |
| 2015/0380918 A1 | 12/2015 | Kellerman | | |
| 2016/0181778 A1* | 6/2016 | Kellerman | .............. | H02G 7/16 |
| | | | | 174/95 |

OTHER PUBLICATIONS

Patent Cooperation Treaty, International Search Report issued for PCT/US2017/022175, dated Jun. 21, 2017, 3 pages Jun. 21, 2017.

* cited by examiner

WATERFALL-TYPE CABLE ROUTER

CROSS-REFERENCE TO RELATED APPLICATIONS

This application claims priority to U.S. Provisional Patent Application No. 62/017,904 and to U.S. Provisional Patent Application No. 62/031,473, the contents of both of which are incorporated herein by reference in their entireties.

FIELD OF THE DISCLOSURE

The present disclosure generally relates to accessories for cable tray systems, and more particularly to waterfall- or spillover-type cable routers for routing cables in and out of cable trays.

BACKGROUND

Cable trays or troughs are used to support cables which run through, over, and around buildings. Cable trays may have both straight and curved (horizontal, vertical, and/or other angled) sections to accommodate the installation requirements of particular settings.

Waterfall- or spillover-type cable router devices assist in routing cables in/out of and over the side walls of the cable tray. Prior art cable router devices can be easily moved out of place or may sag under the weight of cables carried by the cable routers. Therefore, waterfall- or spillover-type cable routers that do not possess these and other shortcomings are necessary.

SUMMARY OF THE DISCLOSURE

Among the various aspects of the present disclosure is the provision of a water-fall type cable router as substantially shown and described.

Briefly, therefore, one aspect of the disclosure is directed to a waterfall-type cable router, comprising a floor having a front side, a rear side, a left side, and a right side, wherein at least a portion of the floor is substantially horizontal. A vertical rear wall extends along the rear side of the floor, a left ramp extends downward from the left side of the floor, a right ramp extends downward from the right side of the floor, and a front ramp extends downward from the front side of the floor. The waterfall-type cable router further includes a vertical left curved wall extending between the left ramp and the front ramp, and a vertical right curved wall extending between the right ramp and the front ramp.

Another aspect of the disclosure is directed to a waterfall-type cable router, comprising a floor having a rear side, a front side, a first side substantially perpendicular to the rear side, and a second side substantially parallel to the first side, wherein at least a portion of the floor is substantially horizontal. A vertical rear wall extends along the rear side of the floor, a first ramp extends downward from the first side of the floor, and a front ramp extends downward from the front side of the floor, a vertical first curved wall extends between the first ramp and the front ramp, and a vertical second wall extends along the second side of the floor.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

Figure 1:
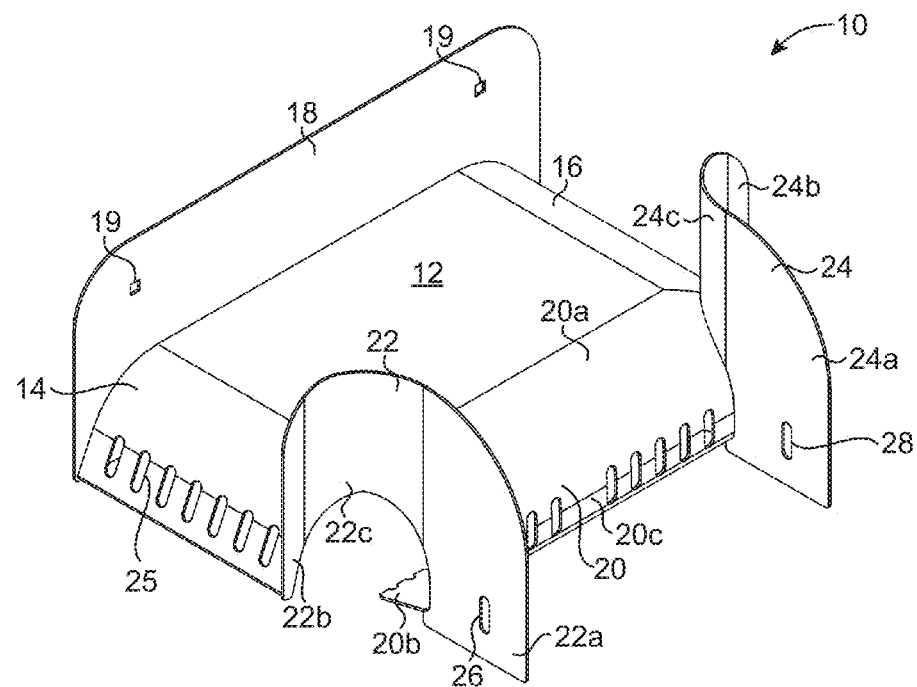
FIG. 1 is a left front perspective view of a cable router according to a first aspect of the disclosure.

The accompanying Figures and this description depict and describe aspects of a cable router in accordance with the present disclosure, and features and components thereof. It should also be noted that any references herein to front and back, right and left, top and bottom and upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a waterfall- or spillover-type cable router. As noted above, waterfall- or spillover-type cable routers assist in routing cables in/out of and over the side walls of cable trays. Accordingly, aspects of the waterfall- or spillover-type cable routers described are capable of routing cables from a first direction to a second direction, wherein the second direction is substantially perpendicular to the first direction.

With reference to FIGS. 1-19, an aspect of a waterfall-type cable router 10 is described in detail. Waterfall-type cable router 10, or simply cable router 10, includes a floor 12 on which cables routed out from cable tray will rest. At least a portion of floor 12 is substantially horizontal. Extending downward from the left side of floor 12 is a left ramp 14. At least a portion of left ramp 14 is curved along a first horizontal axis that is substantially perpendicular to the first direction (see FIG. 2) and substantially parallel to the second direction (see FIG. 2). Extending downward from the right side of floor 12 is a right ramp 16. At least a portion of right ramp 16 is curved along a second horizontal axis that is substantially perpendicular to the first direction and substantially parallel to the second direction and the first horizontal axis.

A vertical rear wall 18 extends a width along the back of cable router 10 from the end of left ramp 14 to the end of right ramp 16. In certain aspects, vertical rear wall 18 may extend past the ends of left and/or right ramps 14, 16. In certain aspects, vertical rear wall 18 may stop short of the ends of left and/or right ramps 14, 16. A population of apertures 19, such as holes or slots, extends through vertical rear wall 18 and, as described more fully elsewhere herein, may be used to secure one or more brackets to cable router 10.

Furthermore, extending downward from the front side of floor 12 is a front ramp 20. At least a portion of front ramp 20 is curved along a third horizontal axis that is substantially parallel to the first direction and substantially perpendicular to the second direction and the first and second horizontal axes. Front ramp 20 has a downward curving portion 20a that extends away from vertical rear wall 18 and a brace portion 20b that extends toward vertical rear wall 18. Accordingly, front ramp 20 curves away from and then back toward rear wall 18. Front ramp 20 also includes a substantially vertical ramp portion 20c extending between downward curving portion 20a and brace portion 20b; however, it will be understood that, in certain aspects, downward curving portion 20a and brace portion 20b may be formed of a continuous curve. Brace portion, or simply brace, 20b provides additional support for cable router 10 when installed on a cable tray 40 (see FIGS. 8-10, 12-18). Furthermore, as will be described more fully elsewhere herein, brace 20b includes a population of notches 21 along the length of the brace 20b. It will also be understood that, in certain aspects, front ramp 20 includes downward curving portion 20a but does not include brace portion 20b or substantially vertical ramp portion 20c.

Figure 3:
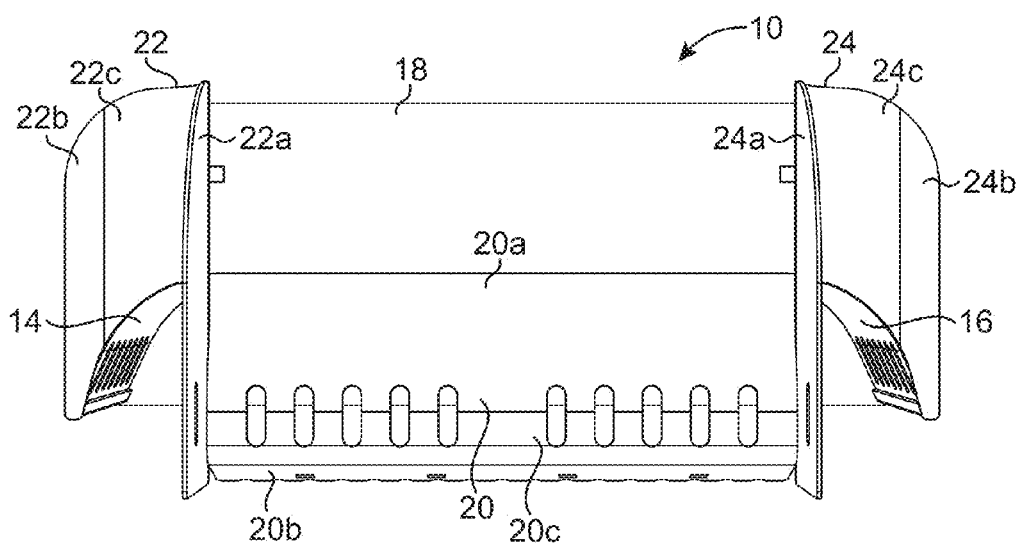
FIG. 3 is a front perspective view of a cable router according to a first aspect of the disclosure.
Figure 4:
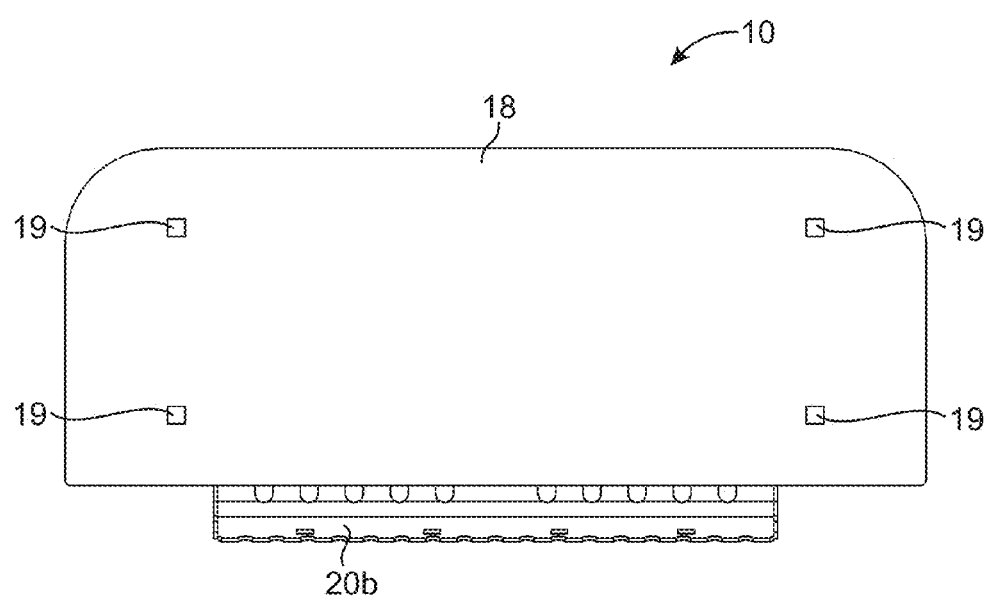
FIG. 4 is a rear perspective view of a cable router according to a first aspect of the disclosure.
Figure 5:
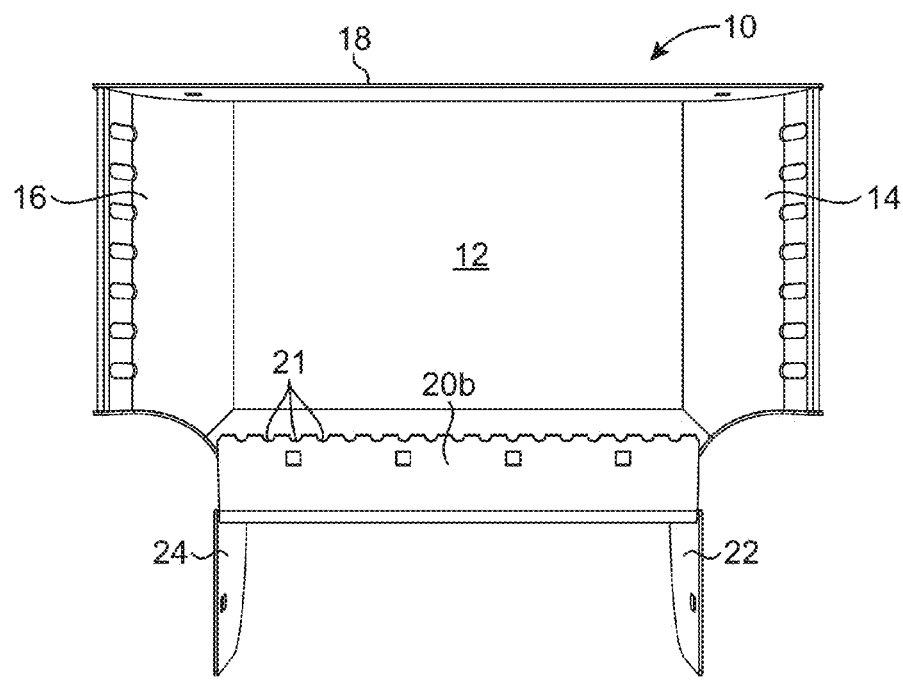
FIG. 5 is a bottom perspective view of a cable router according to a first aspect of the disclosure.
Figure 6:
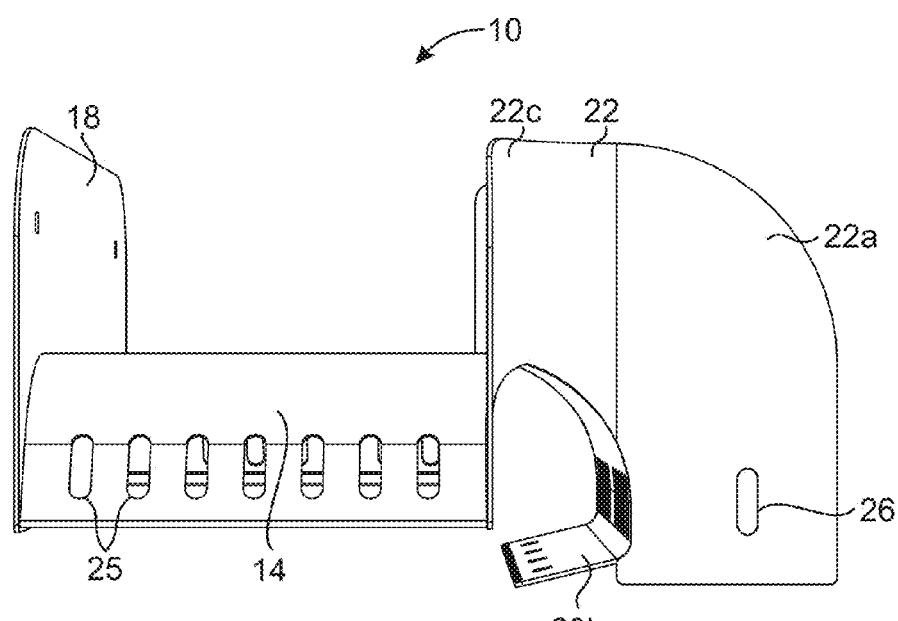
FIG. 6 is a left perspective view of a cable router according to a first aspect of the disclosure.
Figure 7:
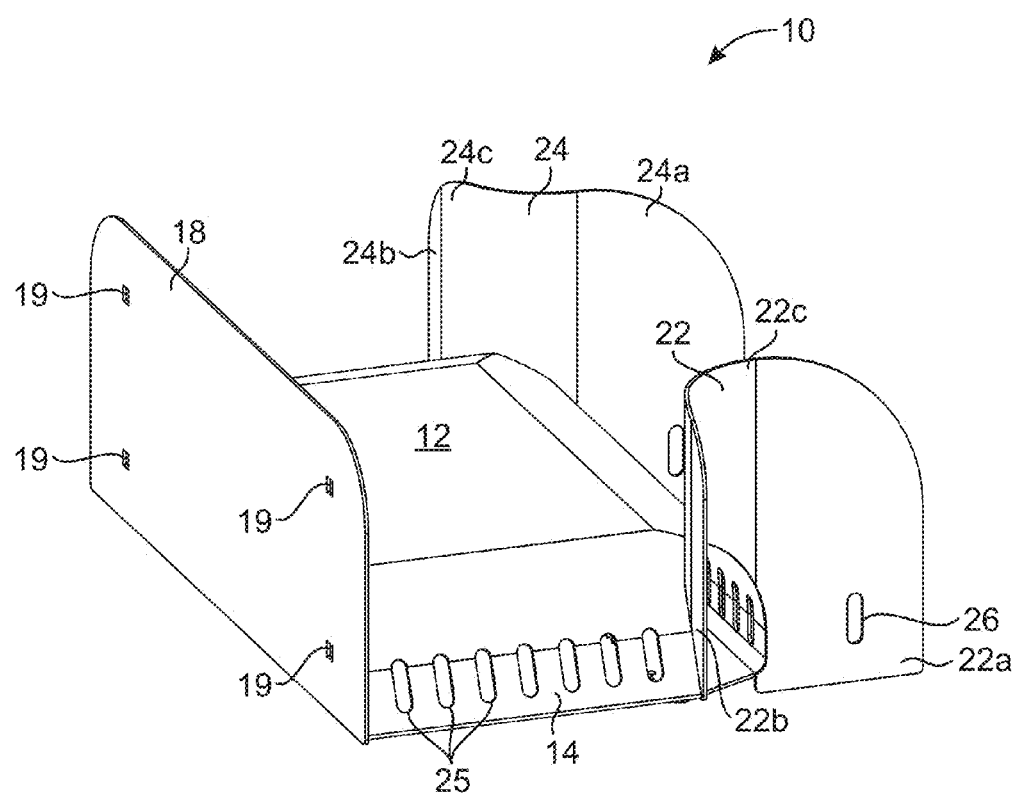
FIG. 7 is a left rear perspective view of a cable router according to a first aspect of the disclosure.

Left ramp 14, right ramp 16, and/or front ramp 20 can include a population of apertures 25, such as holes or slots, extending through left ramp 14, right ramp 16, and/or front ramp 20. The apertures 25 may be used to secure one or more cables to the ramp(s). For instance, zip ties, hose clamps, straps, etc. may be looped through one or more of the population of apertures 25 and around cables routed through cable router 10 to secure cables to cable router 10. Additionally, as illustrated in FIG. 3, in one embodiment, the bottoms of left and right ramps 14, 16 are hemmed. That is, the bottom edge of left ramp 14 is folded over back on itself and the bottom edge of right ramp 16 is folded over back on itself. Hemming left and right ramps 14, 16 creates a smooth edge on the bottom of left and right ramps 14, 16 and reduces or eliminates the potential for cables to snag on the bottom of left and right ramps 14, 16.

Referring again to FIGS. 1-7, cable router 10 further includes a vertical left curved wall 22 extending from left ramp 14 and front ramp 20. A first portion 22a of vertical left curved wall 22 extends forward along the second direction away from rear wall 18. Accordingly, first portion 22a of vertical left curved wall 22 is substantially perpendicular to rear wall 18. Furthermore, a second portion 22b of vertical left curved wall 22 extends leftward along the first direction. Accordingly, second portion 22b of vertical left curved wall 22 is substantially parallel to rear wall 18. A third or curved portion 22c of vertical left curved wall 22 is curved along a first vertical axis that is substantially perpendicular to the first direction and substantially perpendicular to the horizontal portion of floor 12. Thus, vertical left curved wall 22 includes first portion 22a substantially perpendicular to rear wall 18 and second portion 22b substantially parallel to rear wall 18 with third portion 22c transitioning between first and second portions 22a, 22b.

It will be understood that, in certain aspects of cable router 10, vertical left curved wall 22 may not include second portion 22b. In such aspects, the vertical left curved wall 22 terminates at the tangent closest to rear wall 18, such that the tangent is parallel to rear wall 18. It will be understood that, in certain aspects of cable router 10, vertical left curved wall 22 may not include first portion 22a. In such aspects, the vertical left curved wall 22 terminates at the tangent closest to ramp portion 20c, such that the tangent is perpendicular to rear wall 18. It will be understood that, in certain aspects of cable router 10, vertical left curved wall 22 may not include first portion 22a and second portion 22b. In such aspects, the vertical left curved wall 22 terminates at the tangent closest to rear wall 18, such that the tangent is parallel to rear wall 18 and terminates at the tangent closest to ramp portion 20c, such that the tangent is perpendicular to rear wall 18.

An aperture 26, such as a hole or slot, extends through first portion 22a of vertical left curved wall 22 and, as described more fully elsewhere herein, may be used to secure a vertical support drop to cable router 10.

Similarly, cable router 10 further includes a vertical right curved wall 24 extending from right ramp 16 and front ramp 20. As shown in FIGS. 1-7, a first portion 24a of vertical right curved wall 24 extends forward along the second direction away from rear wall 18. Accordingly, first portion 24a of vertical right curved wall 24 is substantially perpendicular to rear wall 18. Furthermore, a second portion 24b of vertical right curved wall 24 extends leftward along the first direction. Accordingly, second portion 24b of vertical right curved wall 24 is substantially parallel to rear wall 18. A third or curved portion 24c of vertical right curved wall 24 is curved along a first vertical axis that is substantially perpendicular to the first direction and substantially perpendicular to the horizontal portion of floor 12. Thus, vertical right curved wall 24 includes first portion 24a substantially perpendicular to rear wall 18 and second portion 24b substantially parallel to rear wall 18 with third portion 24c transitioning between first and second portions 24a, 24b.

It will be understood that, in certain aspects of cable router 10, vertical right curved wall 24 may not include second portion 24b. In such aspects, the vertical right curved wall 24 terminates at the tangent closest to rear wall 18, such that the tangent is parallel to rear wall 18. It will be understood that, in certain aspects of cable router 10, vertical right curved wall 24 may not include first portion 24a. In such aspects, the vertical right curved wall 24 terminates at the tangent closest to ramp portion 20c, such that the tangent is perpendicular to rear wall 18. It will be understood that, in certain aspects of cable router 10, vertical right curved wall 24 may not include first portion 24a and second portion 24b. In such aspects, the vertical right curved wall 24 terminates at the tangent closest to rear wall 18, such that the tangent is parallel to rear wall 18 and terminates at the tangent closest to ramp portion 20c, such that the tangent is perpendicular to rear wall 18.

An aperture 28, such as a hole or slot, extends through first portion 24a of vertical right curved wall 24 and, as described more fully elsewhere herein, may be used to secure a vertical support drop to cable router 10.

Vertical left and right curved walls 22, 24 assist in routing the cables (not shown) from the first direction to the second direction. The radius of third or curved portions 22c, 24c provide a smooth transition from the first direction to the second direction. Accordingly, cables, for example fiber optic cables, routed through cable router 10 are not kinked or bent at a sharp angle (as the performance, reliability and integrity of fiber optic cables can be negatively impacted if the fiber optic cables are kinked or bent).

One or both of first portions 22a, 24a of vertical left and right curved walls 22, 24 may extend a distance, y, from front ramp 20. In certain aspects, for example, the distance, y, from front ramp 20 may be from about 0 mm to about 100 mm (e.g., about 0 mm, about 5 mm, about 10 mm, about 20 mm, about 30 mm, about 40 mm, about 50 mm, about 60 mm, about 70 mm, about 80 mm, about 90 mm, about 100 mm). In certain aspects, the distance, y, from front ramp 20 may be about 70 mm. In certain aspects, the distance, y, from front ramp 20 may be greater than about 100 mm.

Figure 2:
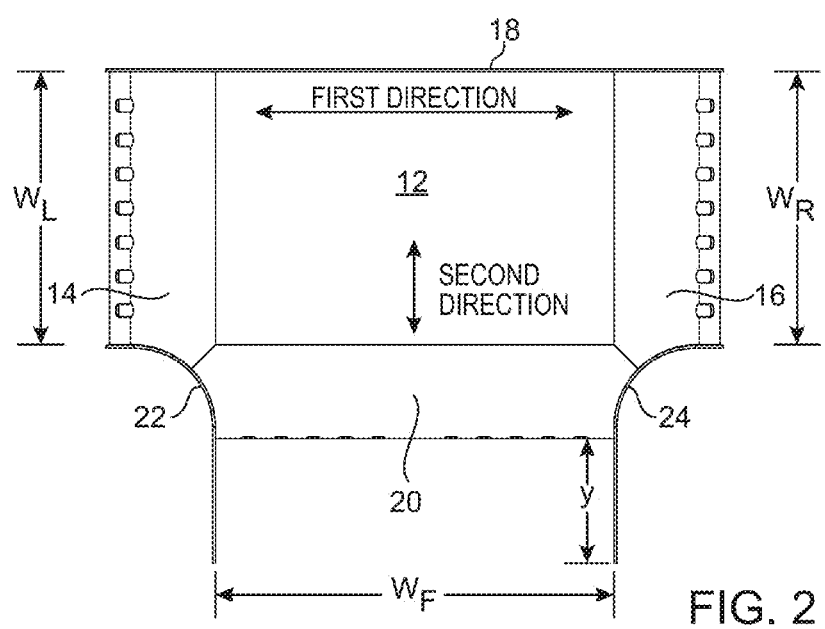
FIG. 2 is a top view of a cable router according to a first aspect of the disclosure.

As shown in FIG. 2, left ramp 14 may have a width, $W_L$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, left ramp 14 has a width, $W_L$, of about 100 mm (about 4 inches). In other aspects, for example, left ramp 14 has a width, $W_L$, of about 150 mm (about 6 inches). Right ramp 16 may have a width, $W_R$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, right ramp 16 has a width, $W_R$, of about 100 mm (about 4 inches). In other aspects, for example, right ramp 16 has a width, $W_R$, of about 150 mm (about 6 inches). In certain aspects, the widths, $W_L$ and $W_R$, of left and right ramps 14, 16 are substantially the same. However, in other aspects, the widths, $W_L$ and $W_R$, of left and right ramps 14, 16 may be different. Front ramp 20 may have a width, $W_F$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, front ramp 20 has a width, $W_F$, of about 120 mm (about 4.75 inches). In other aspects, for example, front ramp 20 has a width, $W_F$, of about 150 mm (about 6 inches). In yet other aspects, for example, front ramp 20 has a width, $W_F$, of about 200 mm (about 8 inches). In various aspects, width, $W_F$, of front ramp 20 is substantially the same as widths, $W_L$ and $W_R$, of left and right ramps 14, 16. In various aspects, width, $W_F$, of front ramp 20 is greater than widths, $W_L$ and $W_R$, of left and right ramps 14, 16 because potentially all of the cables routed up left and right ramps 14, 16 exit front ramp 20. Therefore, the greater width of front ramp 20 allows it to accept the cables routed up left and right ramps 14, 16.

In one embodiment, cable router 10 is constructed of steel or an alloy thereof; however, it will be understood that any type of suitable metal, or plastic, may be used, including, but not limited to, steel, stainless steel, aluminum or alloys thereof. Left, right and front ramps 14, 16, 20 and substantially horizontal portion of floor 12 may be formed of a single sheet of metal. Vertical rear wall 18 and vertical left and right curved walls 22, 24 may be welded to floor 12. In other aspects, cable router 10 may be constructed in a single or multiple pieces of suitable plastics.

Referring now to FIGS. 8-19, cable router 10 is shown installed on or affixed to cable tray 40. In various embodiments, cable tray 40 is a basket-type cable tray comprising a lattice of longitudinal wires 42 and transverse wires 44 secured to one another. Although cable tray 40 is shown as a basket-style cable tray, it will be understood that cable router 10 may be installed on other types and/or constructions of cable tray. Cable tray 40 is substantially a U-shaped trough having a bottom portion 46 and two sidewalls 48 extending upward substantially perpendicular to bottom portion 46. When cable router 10 is installed on cable tray 40, the first direction is parallel to longitudinal wires 42 and the second direction is parallel to transverse wires 44. That is, the first direction is substantially parallel to cable tray 40 and the second direction is substantially perpendicular to cable tray 40. Furthermore, when cable router 10 is installed on cable tray 40, floor 12 is at a height above the top of sidewall 48 and left and right ramps 14, 16 extend downward from above the top of sidewall 48 to below the top of sidewall 48. Left and right ramps 14, 16 reside between side walls 48, 48 above bottom portion 46. Additionally, front ramp 20 extends downward from above the top of sidewall 48 to below the top of sidewall 48. At least a portion of front ramp 20 resides outside of sidewalls 48, 48. Thus, cable router 10 can be said to straddle sidewall 48 wherein portions of cable router 10 are above the top of sidewall 48 and portions of cable router 10 are below the top of sidewall 48 and wherein portions of cable router 10 are between sidewalls 48, 48 and portions of cable router 10 are outside of sidewalls 48, 48. Certain prior art cable routers that require cutting or modification of the cable tray for the cable router to be installed. However, because cable router 10 straddles cable tray 40, cable tray 40 does not need to be cut or modified for cable router 10 to be installed. By not requiring any cuts or modifications to the cable tray, the structural integrity of cable tray 40 is maintained with the use of cable router 10.

In certain aspects, cable router 10 is substantially T-shaped (see FIG. 2). Cables typically run along a first direction in cable tray 40, wherein the first direction is parallel to longitudinal wires 42. If certain cables are desired to drop out of cable tray 40, those cables can be run up left and/or right ramps 14, 16 and will rest on floor 12 including substantially horizontal portion. Those cables will then make a substantially 90 degree turn and will exit cable router 10 out and down front ramp 20 along a second direction. Accordingly, cables routed through cable router 10 will be directed from a first direction to a second direction, wherein the second direction is substantially perpendicular to the first direction. Cable router 10 also permits cables to run under floor 12 of cable router 10 and not be diverted out cable router 10. Cable router 10 does not take up significant space in cable tray 40 and therefore does not impact the routing of cables along cable tray 40.

When installed on cable tray 40, brace 20b of cable router 10 rests on a longitudinal wire 42 of sidewall 48 thereby reducing or preventing cable router 10 from sagging under the weight of cables carried therein. That is, the weight of the cables in cable router 10 is transferred by brace 20b into sidewall 48 preventing front ramp 20 from moving downward or rotating rearward. Furthermore, one or more of the population of notches 21 can rest on a transverse wire 44 of sidewall 48 thereby reducing or preventing cable router 10 from moving longitudinally along cable tray 40. If present, notches 21 may be semicircular in shape; however, it will be understood that notches may also be a variety of shapes including, but not limited to, triangular, square, hexagonal, octagonal, etc. The combination of brace 20b and the population of notches 21 therein serve to lock cable router 10 in place on cable tray 40. Further holding cable router 10 in place are two brackets 50, wherein a first end of each is bolted or otherwise secured to the bottom portion 46 of cable tray 40 and a second end of each is bolted or otherwise secured to rear wall 18 of cable router 10. In one embodiment, bolts will extend through bracket(s) and holes 19 in vertical rear wall 18 of cable router 10. Additionally, bolts may extend through clips 70 (see FIG. 12) wherein clips 70 may be used to secure or lock brackets 50 to longitudinal and/or transverse wires 42, 44 of cable tray 40. It will be understood that in other aspects, fewer than two brackets 50 may be used to affix cable router 10 to cable tray 40. It will also be understood that in yet other aspects, greater than two brackets 50 may be used to affix cable router 10 to cable tray 40, and fastened by various methods.

Figure 19:
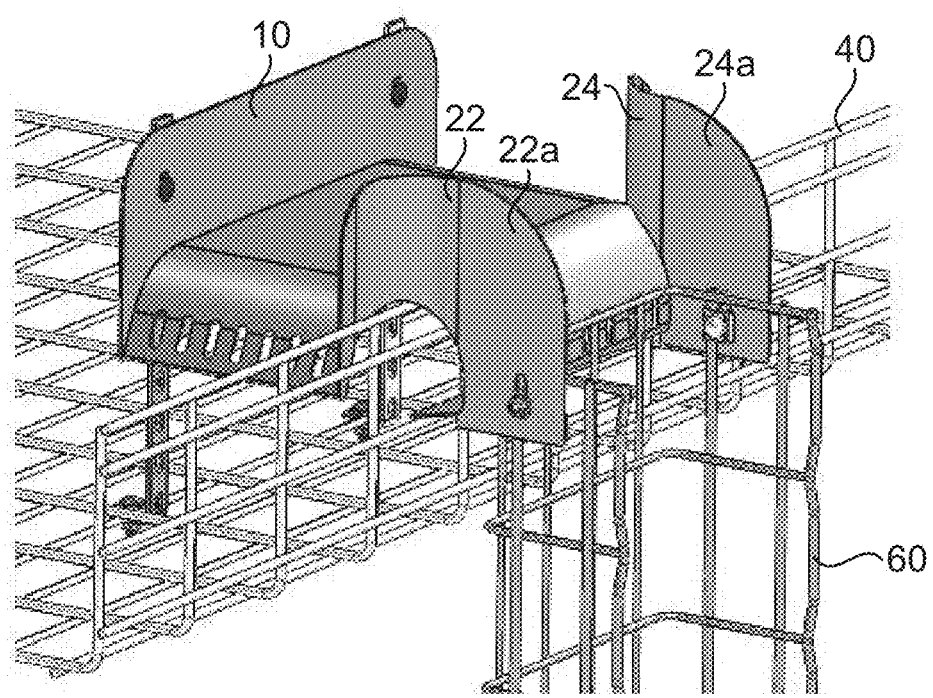
FIG. 19 is a left front perspective view of a cable router affixed to a cable tray and including a vertical drop according to a first aspect of the disclosure.
Figure 20:
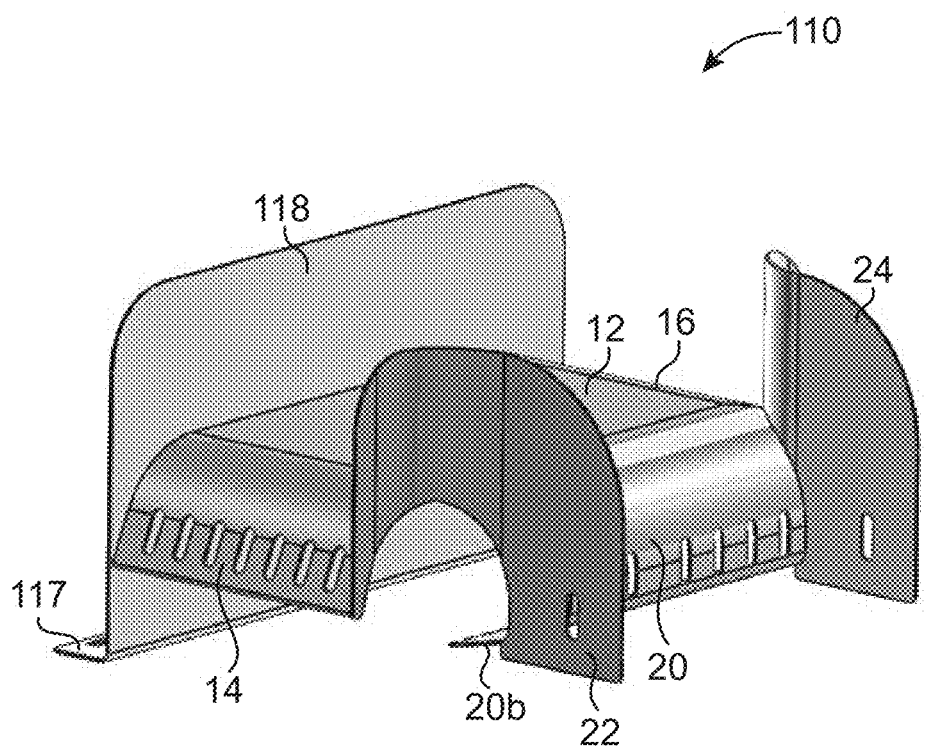
FIG. 20 is a left front perspective view of a cable router according to a second aspect of the disclosure.
Figure 21:
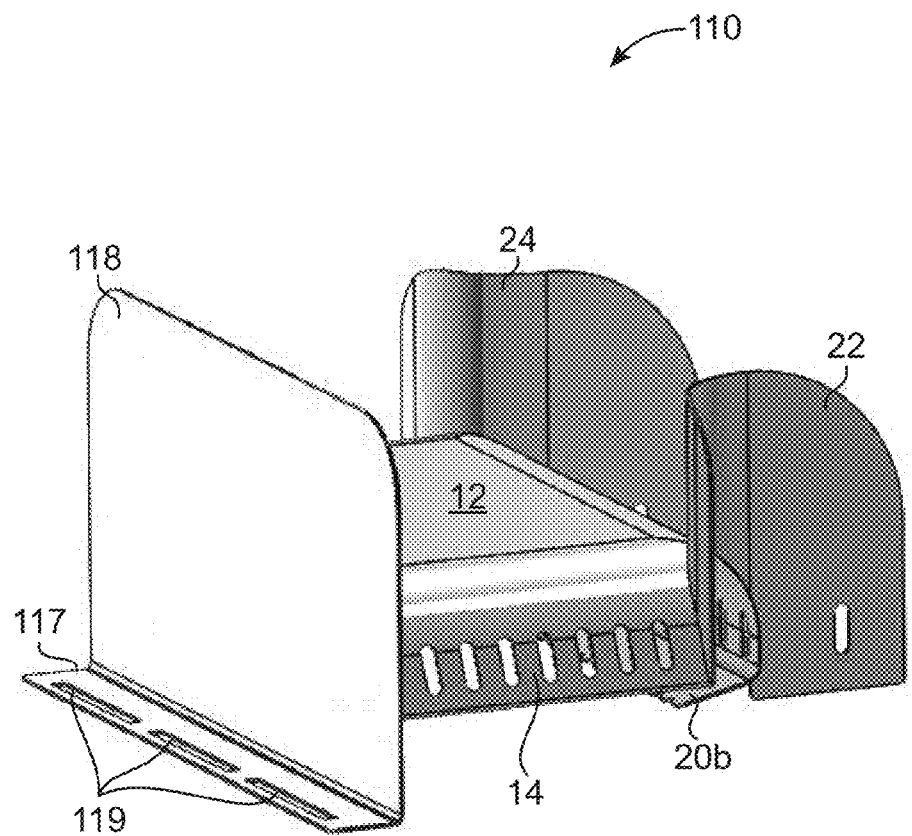
FIG. 21 is a right rear perspective view of a cable router according to a second aspect of the disclosure.
Figure 22:
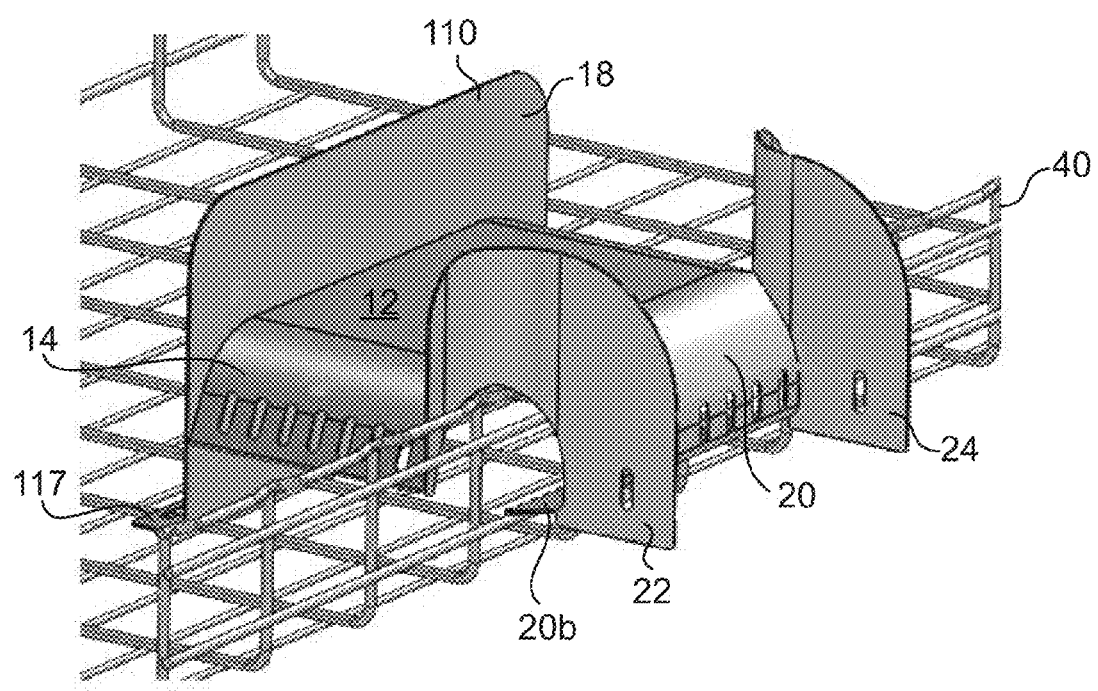
FIG. 22 is a left front perspective view of a cable router affixed to a cable tray according to a second aspect of the disclosure.
Figure 23:
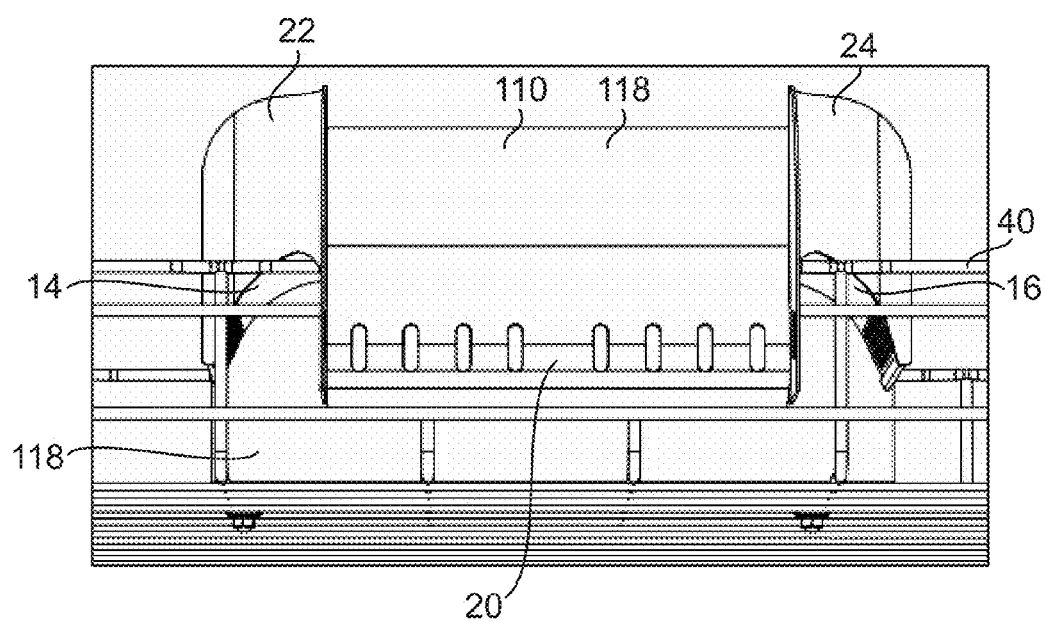
FIG. 23 is a front perspective view of a cable router affixed to a cable tray according to a second aspect of the disclosure.
Figure 24:
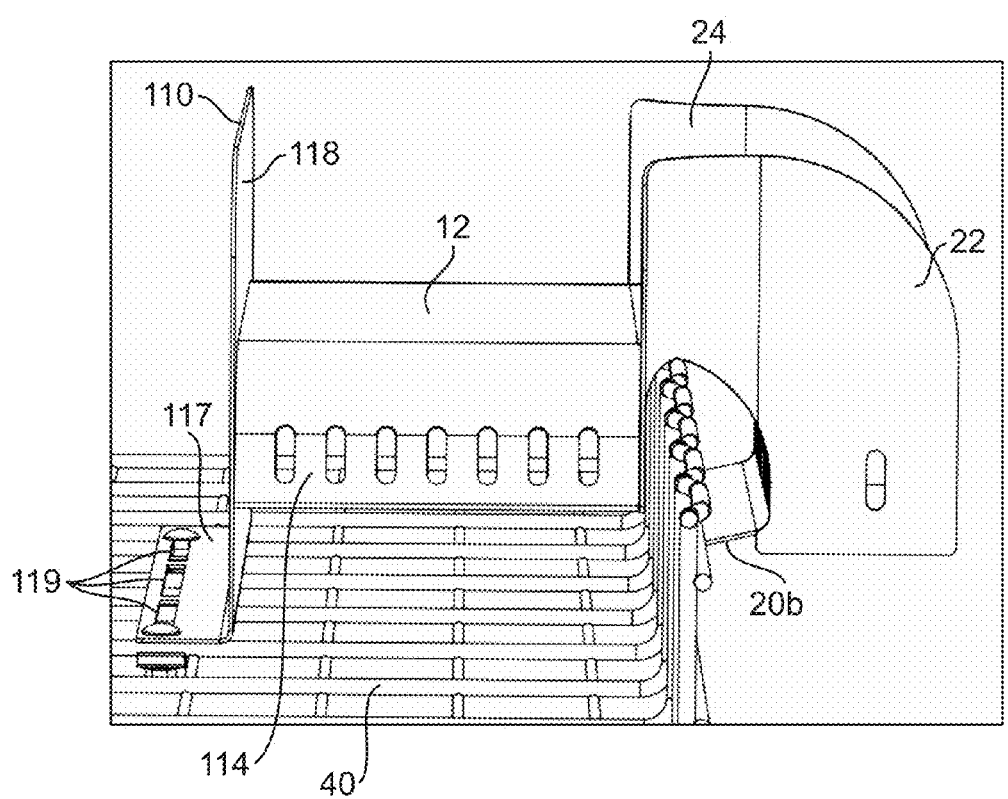
FIG. 24 is a left perspective view of a cable router affixed to a cable tray according to a second aspect of the disclosure.
Figure 25:
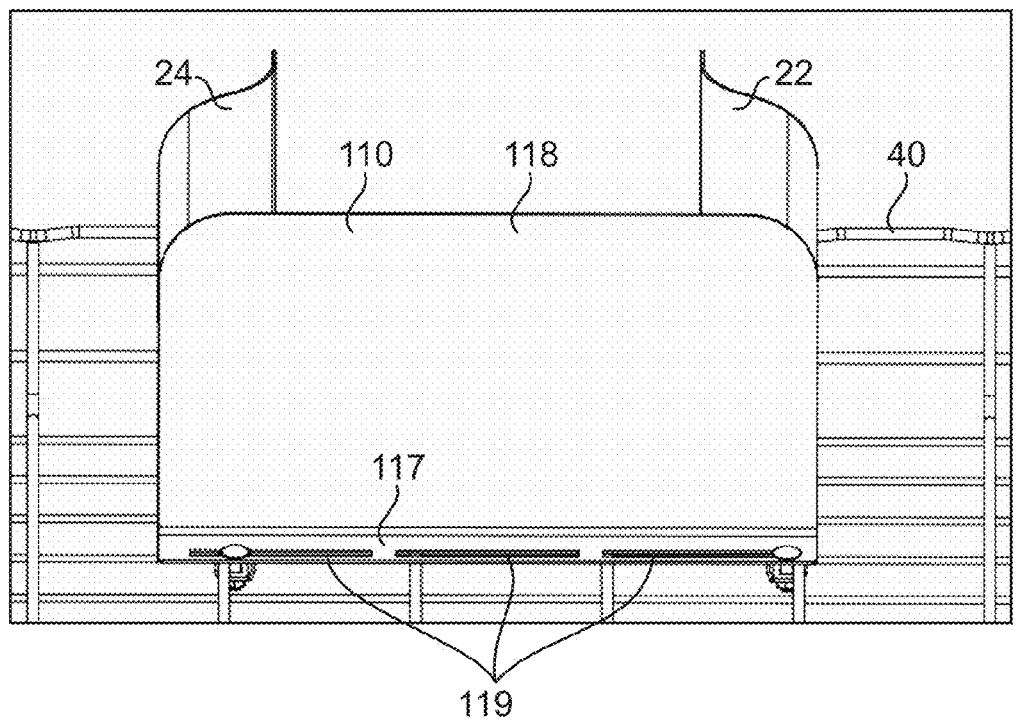
FIG. 25 is a rear perspective view of a cable router affixed to a cable tray according to a second aspect of the disclosure.
Figure 26:
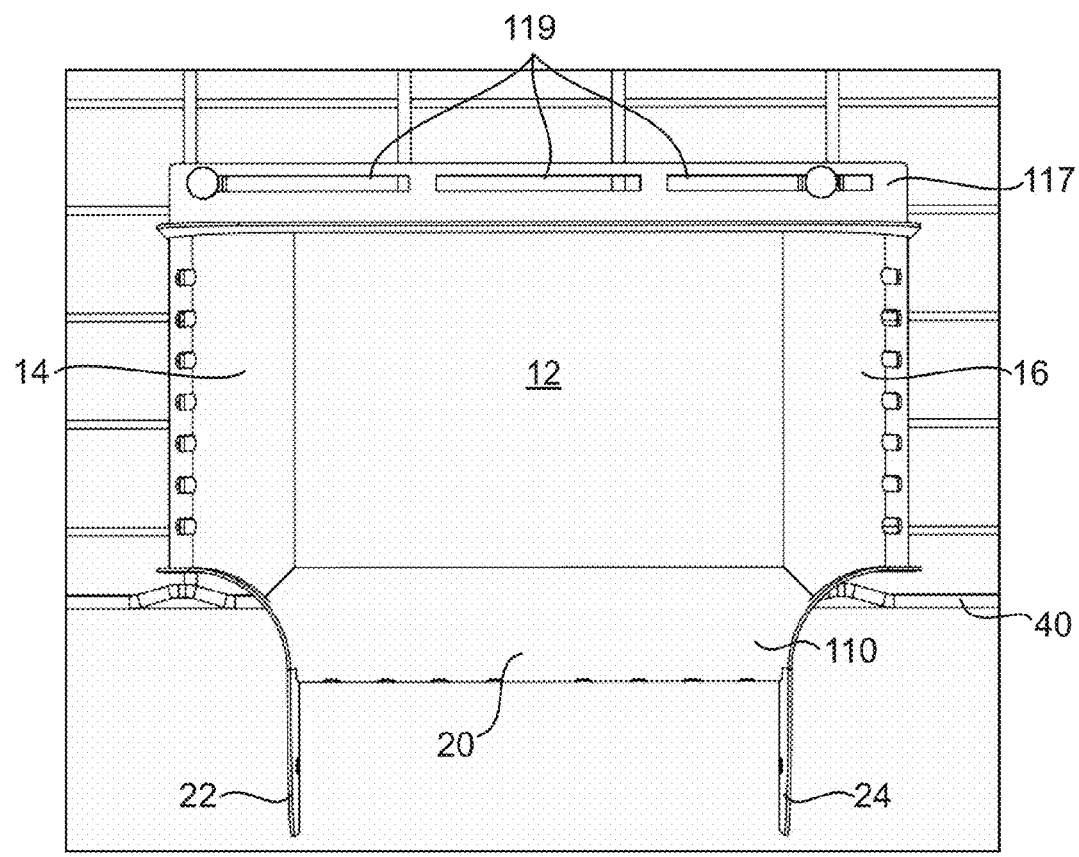
FIG. 26 is a top view of a cable router affixed to a cable tray according to a second aspect of the disclosure.
Figure 27:
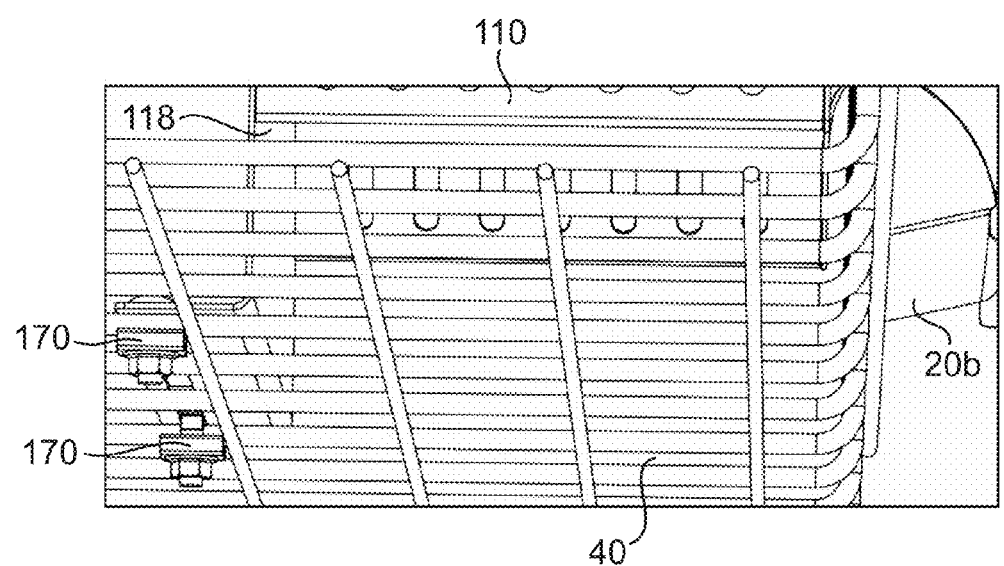
FIG. 27 is a left bottom perspective view of a cable router affixed to a cable tray according to a second aspect of the disclosure.

With reference to FIG. 19, a vertical support drop 60 may be bolted or otherwise secured to cable router 10. Vertical support drop 60 is shown between first portions 22a, 24a of vertical left and right curved walls 22, 24. As illustrated, in certain aspects, bolts may extend through apertures 26, 28 of vertical left and right curved walls 22, 24 to secure vertical support drop 60 to cable router 10. In other aspects, cable router 10 may include or be adapted to accept clips (not shown) on first portions 22a, 24a of vertical left and right curved walls 22, 24. Vertical support drop 60 may be secured to cable router 10 using the clips in addition to or instead of bolts through apertures 26, 28. Cables routed through cable router 10 may be further routed down vertical support drop 60. Vertical support drop 60 is shown as a basket-style vertical support drop having construction similar to that of cable tray 40. However, it will be understood that other types and/or construction of vertical support drop may be used.

Alternative aspects of cable trays according to the disclosure are illustrated in FIGS. 20-46 and are described in detail below. Some features of one or more of cable trays 10, 110, 210, 310, 410, 510, 610, 710, and 810 are common to one another and, accordingly, descriptions of such features in one aspect should be understood to apply to other aspects. Furthermore, particular characteristics of one aspect may be used in combination with, or instead of, particular characteristics of another aspect.

FIGS. 20-27 illustrate another aspect of cable router 110 wherein a flange 117 extends substantially horizontally from the bottom edge of vertical rear wall 118. Cable router 110 also includes floor 12, left ramp 14, right ramp 16, front ramp 20 (including brace portion 20b), vertical left curved wall 22, and vertical right curved wall 24. Vertical rear wall 118 may extend a distance below the ends of left and right ramps 14, 16 such that the bottom edge of vertical rear wall 118 may be located proximate and/or contact bottom portion 46 of cable tray 40 to provide support for cable router 110. A population of apertures 119, such as slots or holes, extend along the length of flange 117. Unlike cable router 10, flange 117 and the population of apertures 119 permit cable router 110 to be installed or affixed to cable tray 40 without the need for brackets 50. Bolts may extend through one or more of the population of apertures 119 to secure cable router 110 to cable tray 40. Additionally, bolts may extend through clips 170 (see FIG. 27) wherein clips 170 may be used to secure or lock vertical rear wall 118 to longitudinal and/or transverse wires 42, 44 of cable tray 40. Prior to tightening of bolts and/or when the bolts are loosened, the population of apertures 119 (e.g., slots or holes) permit easy adjustment and/or alignment of cable router 110 along the first direction (e.g., the longitudinal direction of cable tray 40). When cable router 110 is located in the desired location on cable tray 40, the bolts are tightened to secure cable router 110 in place.

Figure 28:
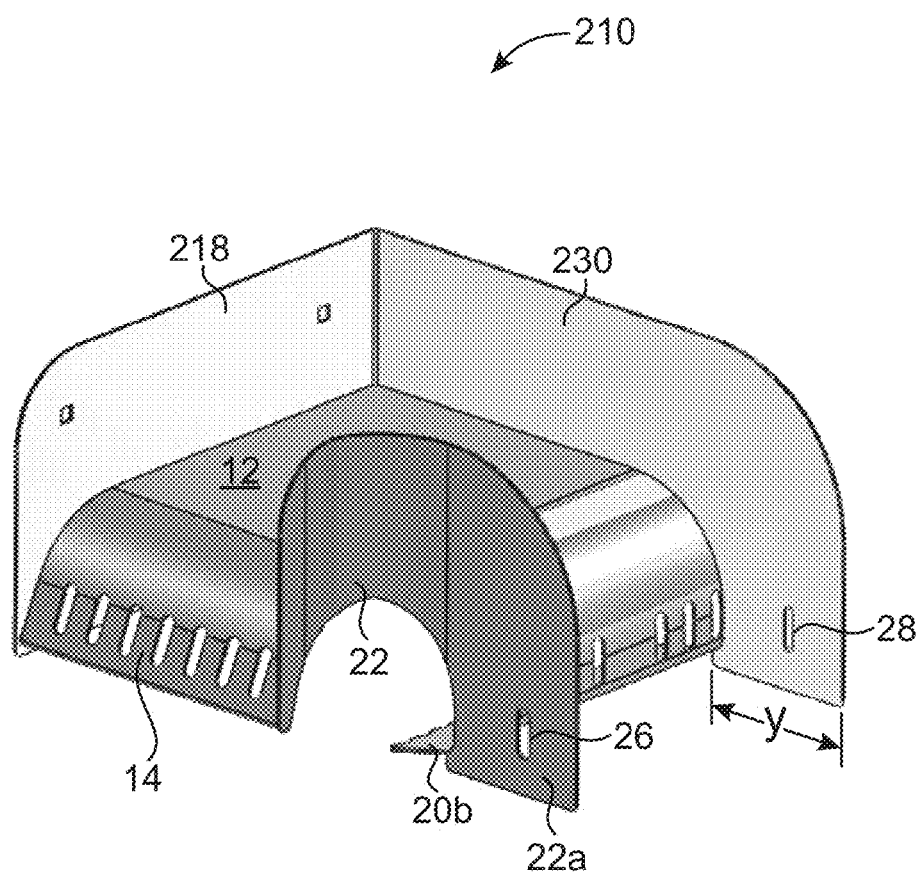
FIG. 28 is a left front perspective view of a cable router according to a third aspect of the disclosure.

Referring now to FIG. 28 another aspect of cable router 210 is described in detail. Cable router 210 includes floor 12, left ramp 14, vertical rear wall 18, front ramp 20 (including brace portion 20b), and vertical left curved wall 22. However, cable router 210 does not include a right ramp. As shown, cable router 210 includes a right wall 230 extending substantially perpendicular from vertical rear wall 218 along the second direction. A portion of right wall 230 may extend the same distance, y, as first portion 22a of vertical left curved wall 22 as described in conjunction with vertical left curved wall 22 of cable router 10. Additionally, an aperture 28, such as a hole or slot, extends through a portion of right wall 230 and, as described more fully elsewhere herein, may be used to secure a vertical support drop to cable router 210. Accordingly, cable router 210 only allows cables to be routed up and/or down left ramp 14 and front ramp 20 of cable router 210. Thus, unlike cable router 10, there is only one cable input and only one cable output. It will be understood in this regard, that the cable routers described herein can direct cables in a number of directions. That is, while shown as having a right vertical wall and a left ramp, it will be understood that other aspects of cable router may include a left vertical wall and a right ramp.

Figure 29:
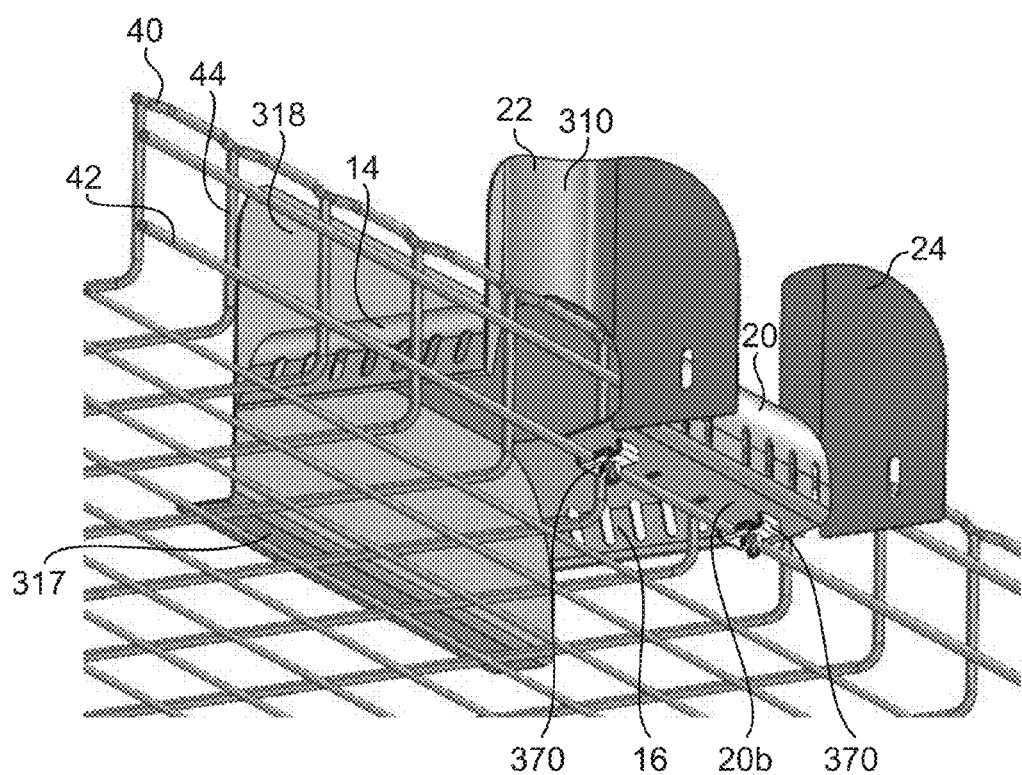
FIG. 29 is a left bottom perspective view of a cable router affixed to a cable tray according to a fourth aspect of the disclosure.

Referring now to FIG. 29 another aspect of cable router 310 is described in detail. Cable router 310 includes floor 12, left ramp 14, right ramp 16, front ramp 20 (including brace portion 20b), vertical left curved wall 22, and vertical right curved wall 24. Vertical rear wall 318 may extend a distance below the ends of left and right ramps 14, 16 such that the bottom edge of vertical rear wall 318 may be located proximate and/or contact bottom portion 46 of cable tray 40 to provide support for cable router 310. This aspect of cable router 310 may also include a flange 317 extending substantially horizontally from the bottom edge of vertical rear wall 318. In addition to or instead of the population of notches 21 along the length of the brace 20b shown in cable router 10 (see FIGS. 13-18), cable router 310 may include one or more clips 370 which may be bolted onto brace 20b. Clips 370 may be used to secure or lock brace 20b onto one or more of the population of longitudinal wires 42. Thus, in certain aspects, the cable router may include both a population of notches and one or more clips for securing the cable router to the cable tray. In other aspects, for example, the cable router may include only one or more clips for securing the cable router to the cable tray (i.e., without a population of notches).

Figure 30:
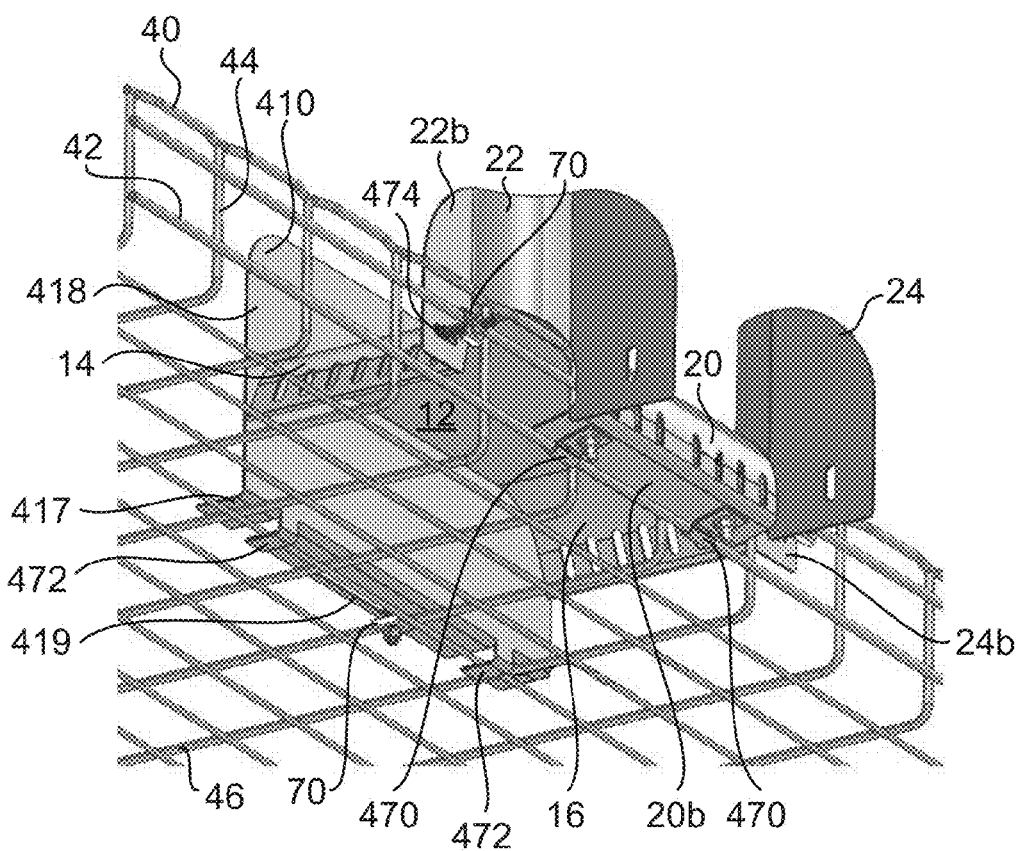
FIG. 30 is a left bottom perspective view of a cable router affixed to a cable tray according to a fifth aspect of the disclosure.
Figure 31:
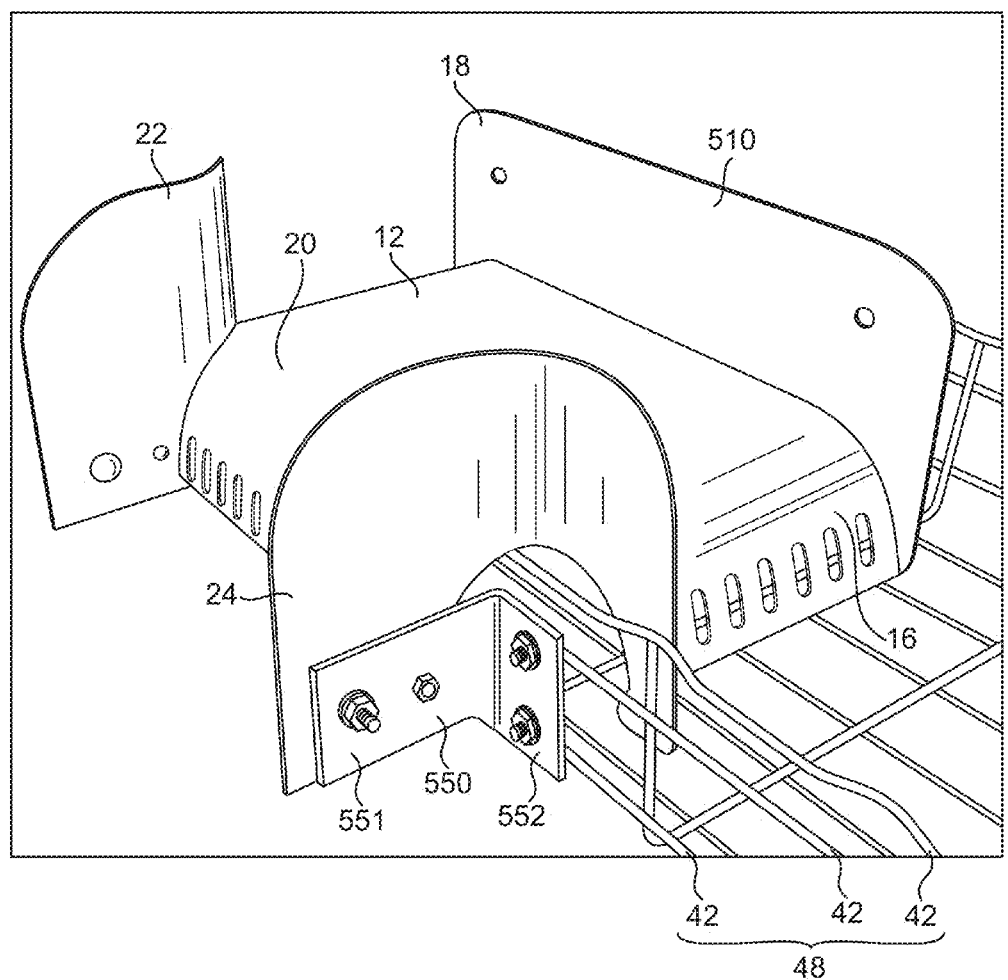
FIG. 31 is a right front perspective view of a cable router affixed to a cable tray according to a sixth aspect of the disclosure.
Figure 32:
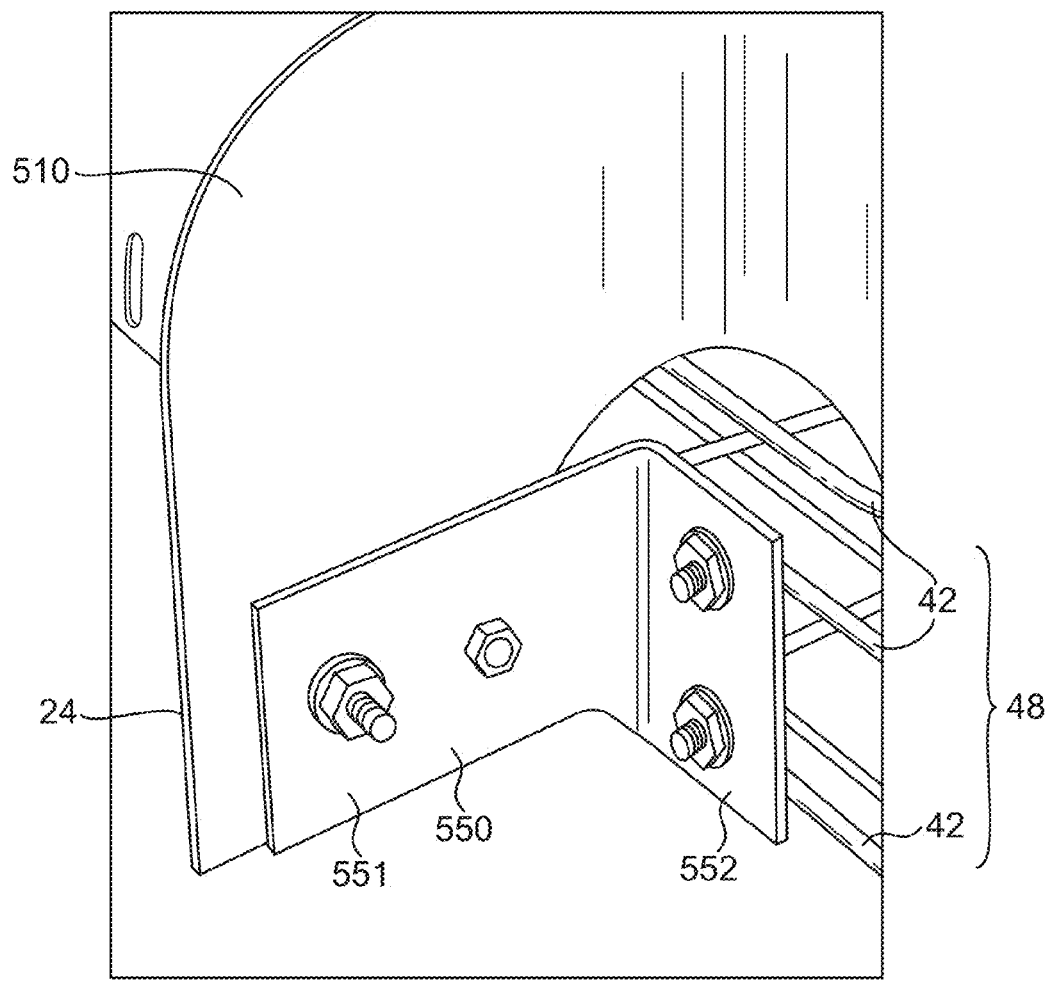
FIG. 32 is a detail right front perspective view of a cable router affixed to a cable tray according to a sixth aspect of the disclosure.
Figure 33:
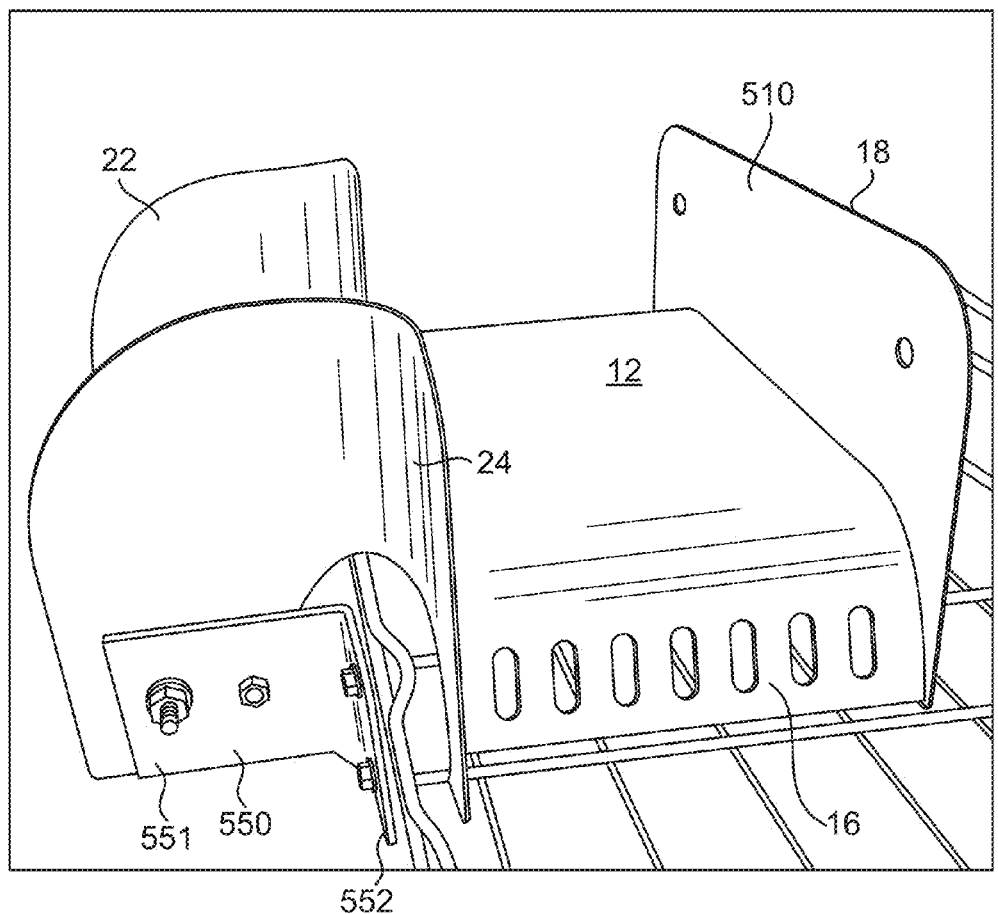
FIG. 33 is a right perspective view of a cable router affixed to a cable tray according to a sixth aspect of the disclosure.
Figure 34:
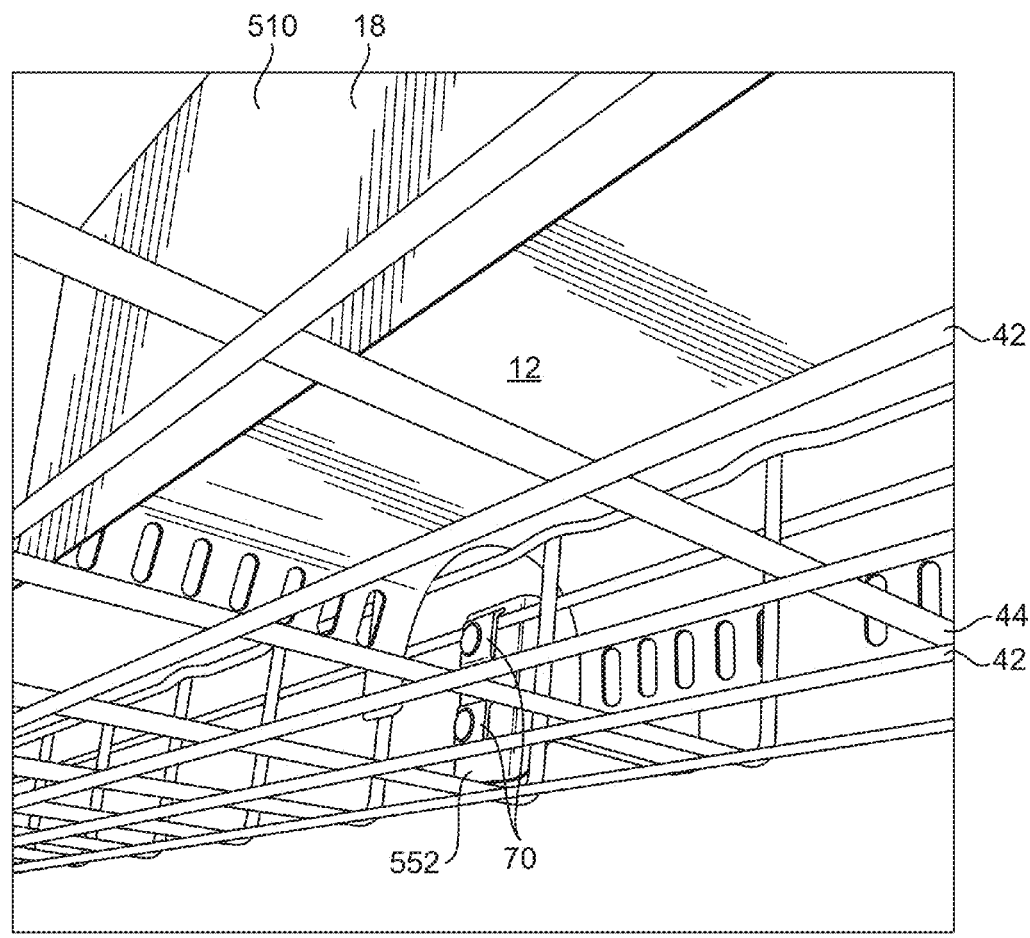
FIG. 34 is a left bottom perspective view of a cable router affixed to a cable tray according to a sixth aspect of the disclosure.

FIG. 30 illustrates another aspect of cable router 410 wherein a flange 417 extends substantially horizontally from the bottom edge of vertical rear wall 418. Cable router 410 also includes floor 12, left ramp 14, right ramp 16, front ramp 20 (including brace portion 20b), vertical left curved wall 22, and vertical right curved wall 24. Vertical rear wall 418 may extend a distance below the ends of left and right ramps 14, 16 such that the bottom edge of vertical rear wall 418 may be located proximate and/or contact bottom portion 46 of cable tray 40 to provide support for cable router 410. A population of apertures 419, such as slots or holes, extend along the length of flange 417. Cable tray 419 is shown as having a single aperture 419 located substantially in the middle of flange 417 between left and right ramps 14, 16. It will be understood however, that aspects of cable tray 419 may include any number and/or location of apertures 419 without departing from the disclosure.

Figure 8:
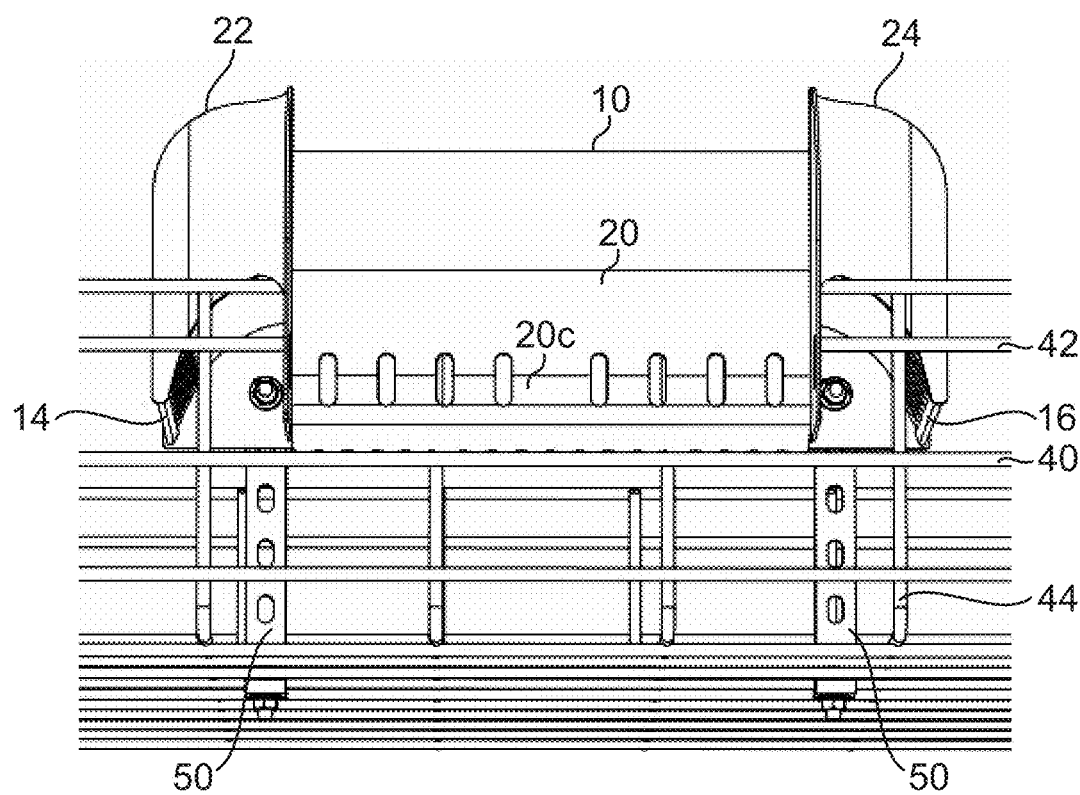
FIG. 8 is a front perspective view of a cable router affixed to a cable tray according to a first aspect of the disclosure.
Figure 9:
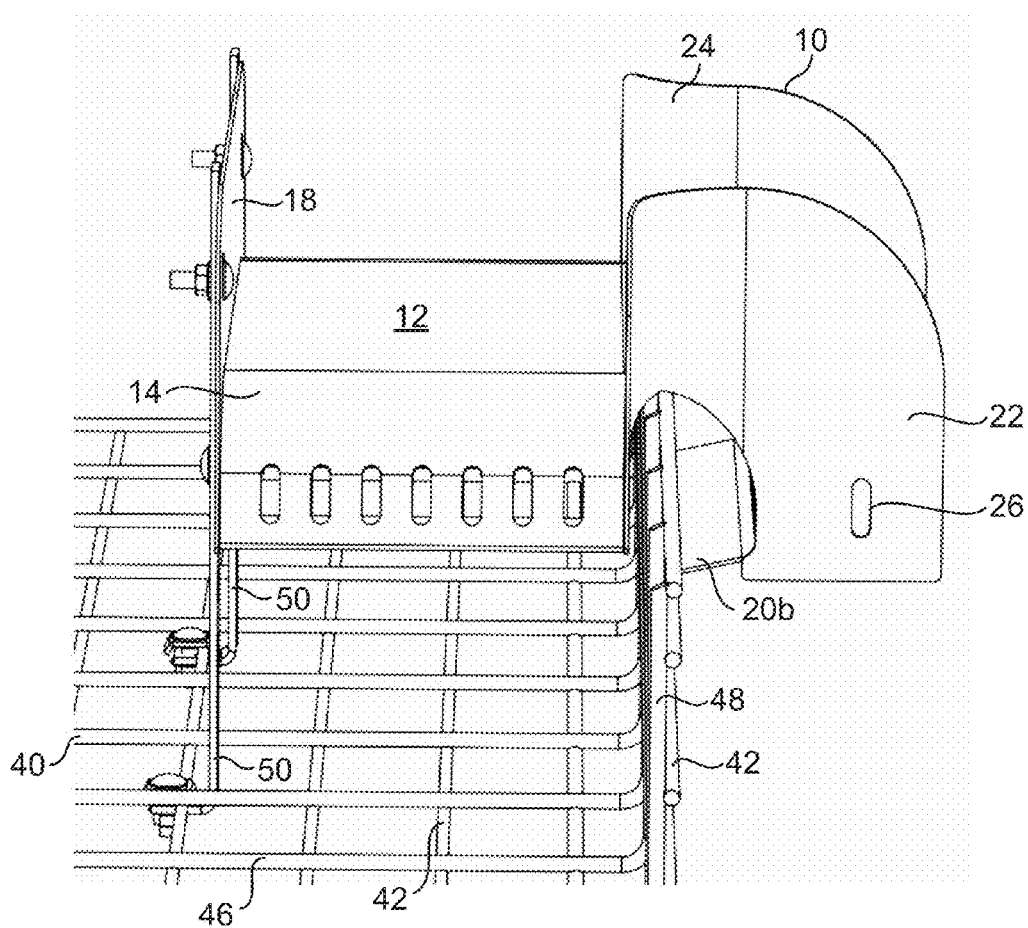
FIG. 9 is a left perspective view of a cable router affixed to a cable tray according to a first aspect of the disclosure.
Figure 10:
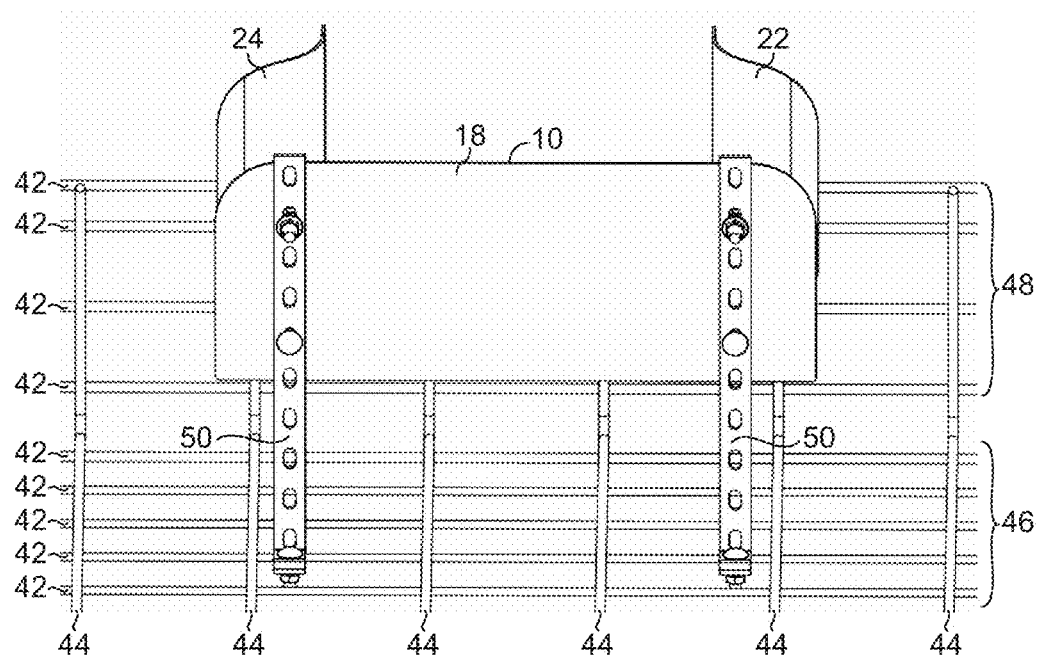
FIG. 10 is a rear perspective view of a affixed to a cable tray cable router according to a first aspect of the disclosure.
Figure 11:
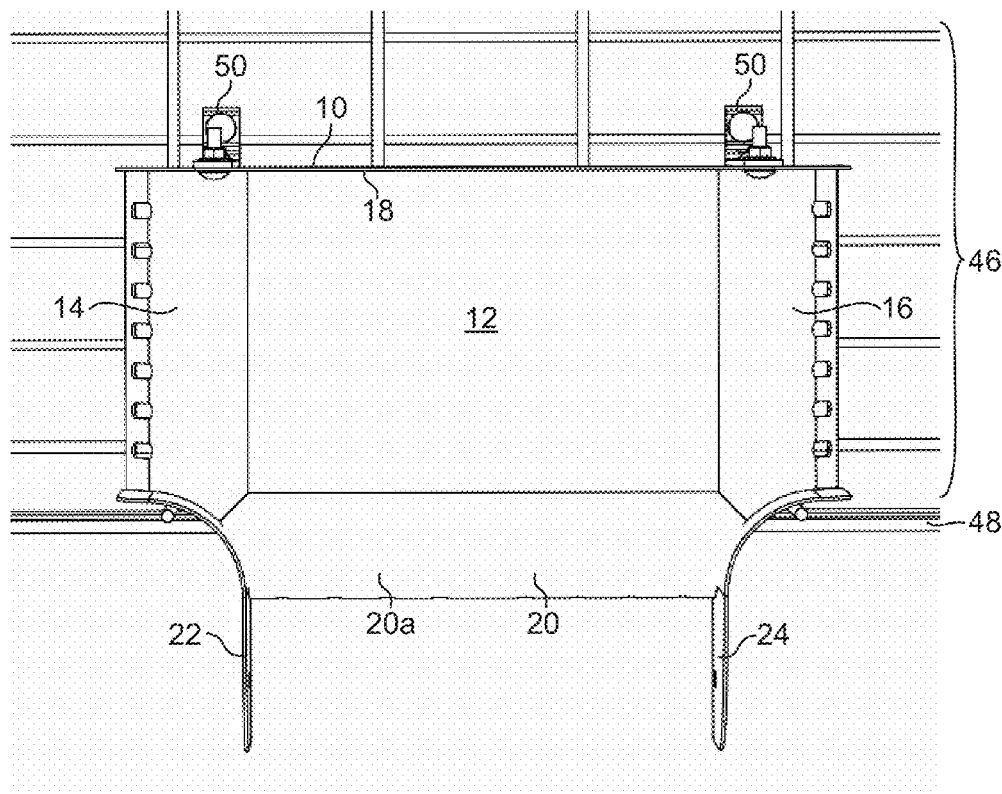
FIG. 11 is a top view of a cable router affixed to a cable tray according to a first aspect of the disclosure.
Figure 12:
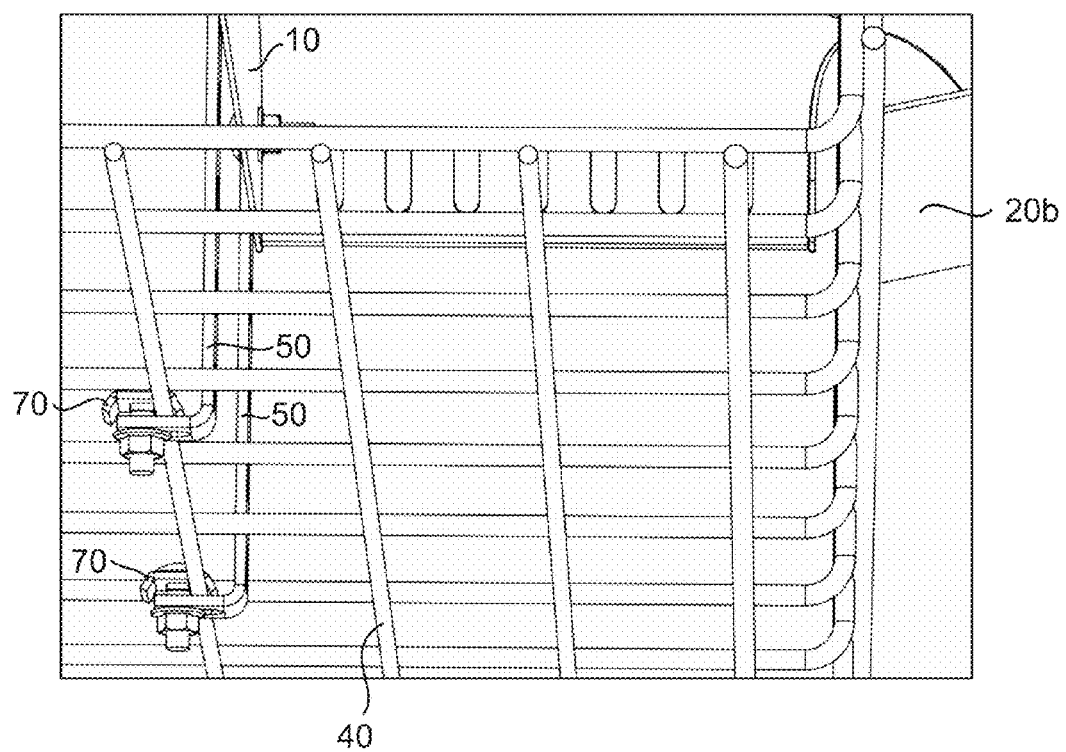
FIG. 12 is a left bottom perspective view of a cable router affixed to a cable tray according to a first aspect of the disclosure.
Figure 13:
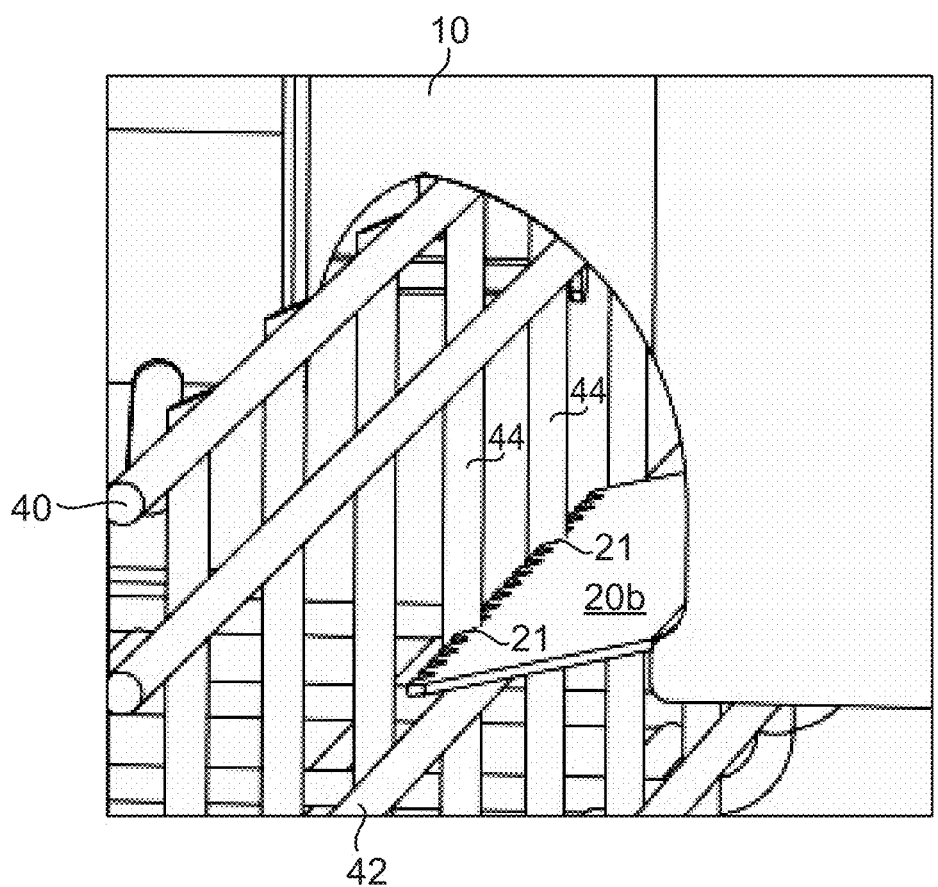
FIG. 13 is a left front perspective view of a cable router affixed to a cable tray according to a first aspect of the disclosure.
Figure 14:
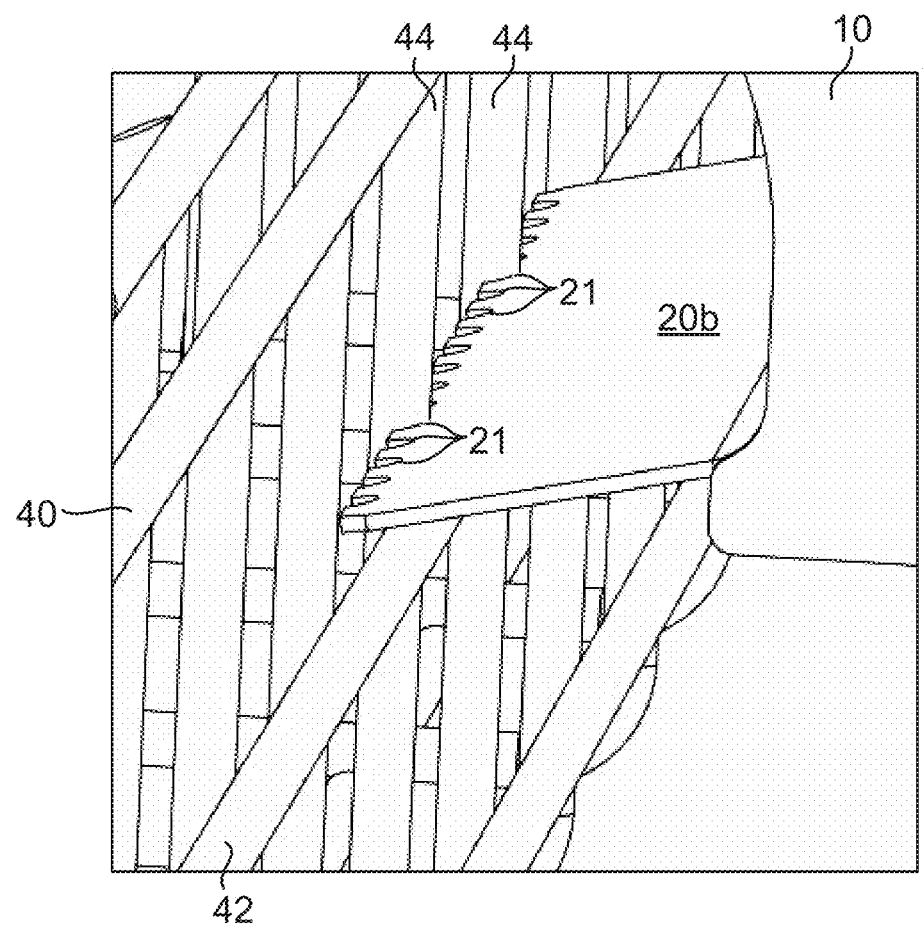
FIG. 14 is a left front perspective view of a cable router affixed to a cable tray according to a first aspect of the disclosure.
Figure 15:
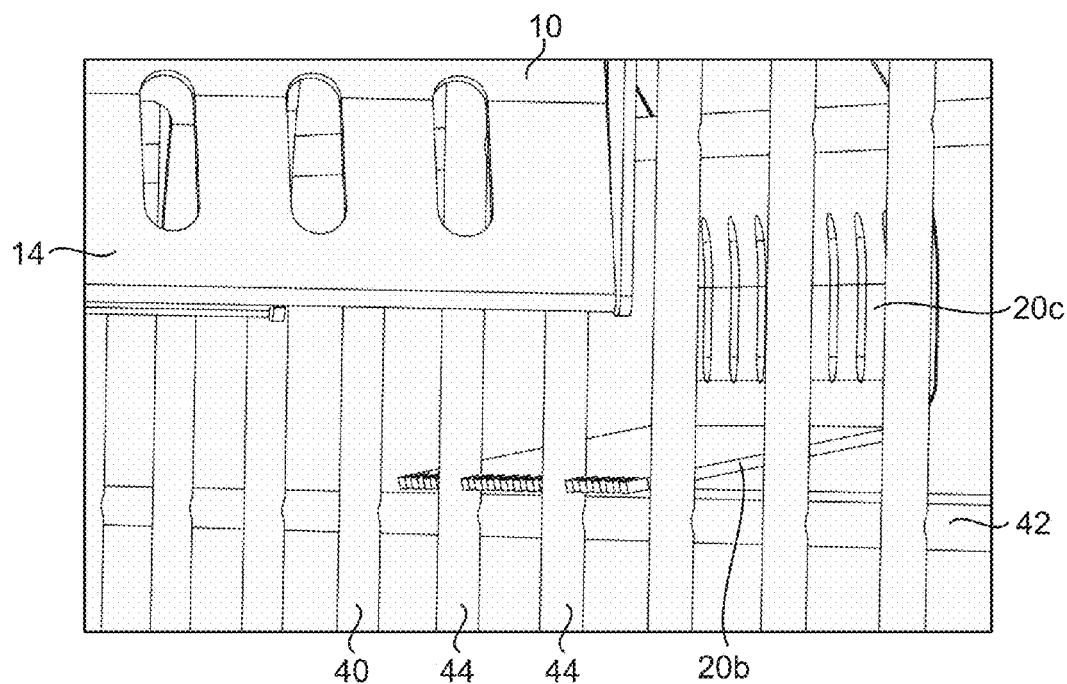
FIG. 15 is a left perspective view of a cable router affixed to a cable tray according to a first aspect of the disclosure.
Figure 16:
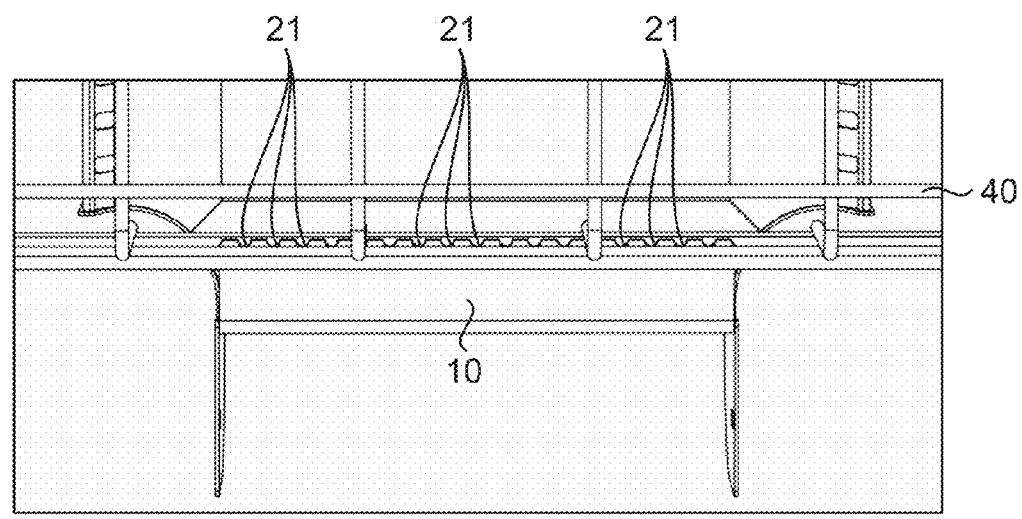
FIG. 16 is a bottom view of a cable router affixed to a cable tray according to a first aspect of the disclosure.
Figure 17:
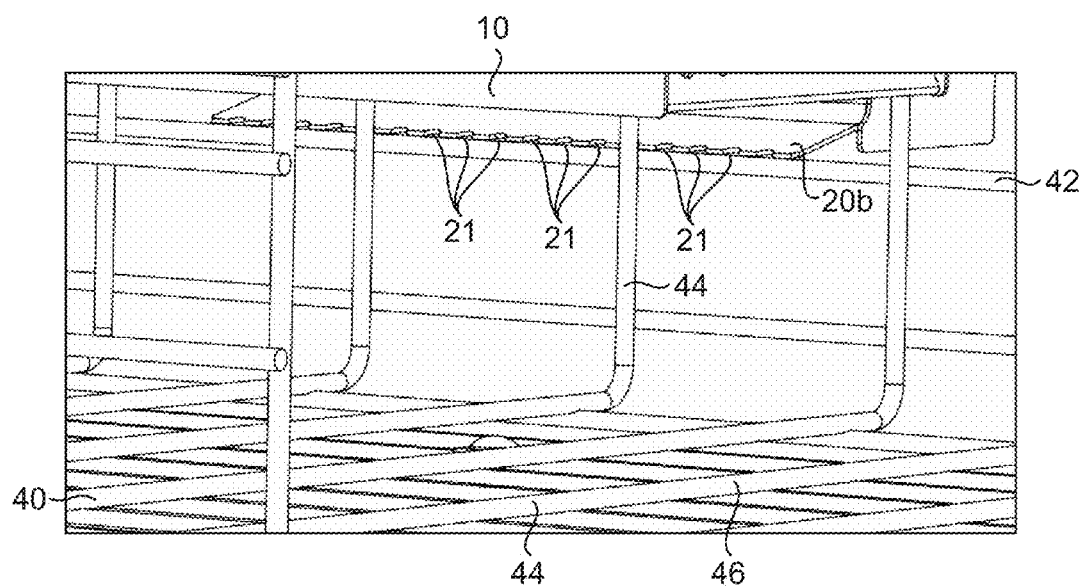
FIG. 17 is a right rear perspective view of a cable router affixed to a cable tray according to a first aspect of the disclosure.
Figure 18:
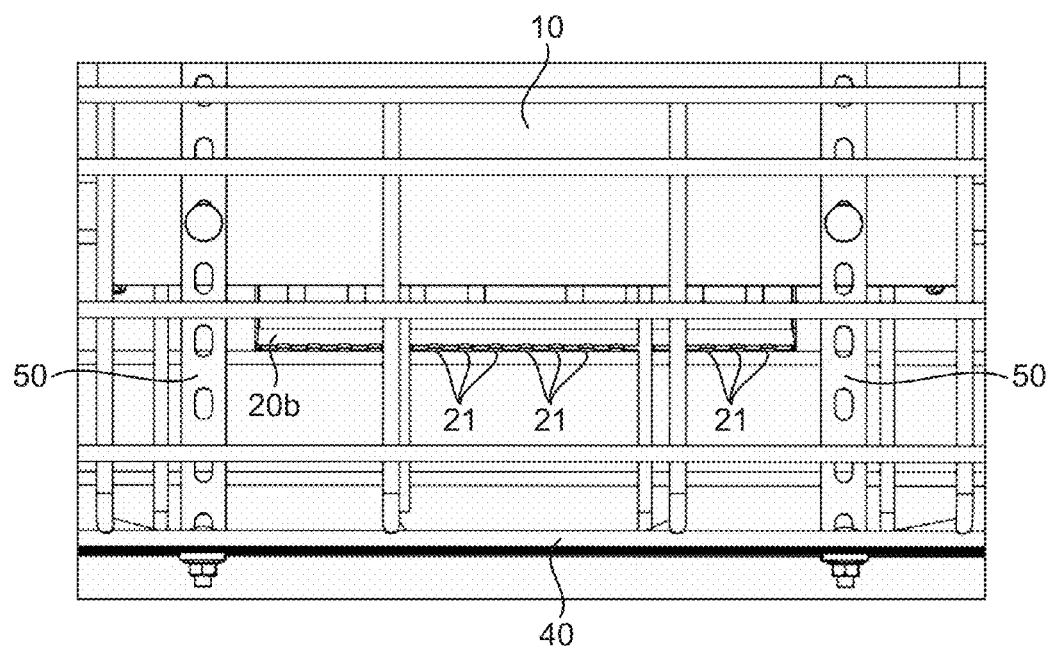
FIG. 18 is a rear perspective view of a cable router affixed to a cable tray according to a first aspect of the disclosure.

Unlike cable router 10, flange 417 and the population of apertures 419 permit cable router 410 to be installed or affixed to cable tray 40 without the need for brackets 50 (see, e.g., FIG. 8). Bolts may extend through one or more of the population of apertures 419 to secure cable router 410 to cable tray 40. Additionally, bolts may extend through clips 70 wherein clips 70 may be used to secure or lock vertical rear wall 418 to longitudinal and/or transverse wires 42, 44 of cable tray 40.

Additionally, in some aspects, a population of tabs 472 may extend below flange 417 and may be used to secure cable router 410 to cable tray 40. Tabs 472 may be substantially parallel to flange 417 and may extend a sufficient distance below flange 417 so that flange 417 can rest on top of longitudinal and/or transverse wires 42, 44 of cable tray 40 and so that tabs 472 may be below and/or contact bottom of longitudinal and/or transverse wires 42, 44 of cable tray 40. That is, when cable router 410 is installed, longitudinal and/or transverse wires 42, 44 of cable tray 40 are sandwiched between flange 417 and tabs 472. Tabs 472 accordingly may assist in maintaining the position of cable router 410 and/or may assist in reducing or preventing cable router 410 from sagging under the weight of cables carried therein. Cable tray 419 is shown as having two tabs 472 located proximate the left and right edges of flange 417. It will be understood however, that aspects of cable tray 419 may include any number and/or location of tabs 472 without departing from the scope of the disclosure.

With continued reference to FIG. 30, in addition to or instead of the population of notches 21 along the length of the brace 20b shown in cable router 10, cable router 410 may include one or more clips 470 which may be bolted onto brace 20b. Clips 470 may lock brace 20b onto one or more of the population of longitudinal wires 42. Furthermore, in this aspect, for example, the second portions of vertical left and right curved walls 22b, 24b of cable router 410 may be extended as compared to the second portions of left and right curved walls 22b, 24b of cable router 10 and may further include apertures 474, such as holes or slots, extending through the second portions of left and right curved walls 22b, 24b. Bolts may extend through one or more of the population of apertures 474 to secure cable router 410 to cable tray 40. Additionally, bolts may extend through clips 470 wherein clips 470 may be used to secure or lock vertical left and right curved walls 22, 24 to longitudinal and/or transverse wires 42, 44 of cable tray 40.

FIGS. 31-34 illustrate yet another aspect of cable router 510 wherein cable router 510 is secured to cable tray 40 using two substantially L-shaped brackets 550. Cable router 510 includes floor 12, left ramp 14, right ramp 16, rear wall 18, front ramp 520, vertical left curved wall 22, and vertical right curved wall 24. Unlike cable router 10, front ramp 520 of cable router 510 does not include brace 20b. However, the front portion of front ramp 520 may curve rearward to reduce or eliminate any sharp edges that could catch or snag cables routed up or down front ramp 520. Cable router 510 further includes two substantially L-shaped brackets 550, one of which is bolted or otherwise secured to vertical left curved wall 22 and one of which is bolted or otherwise secured to vertical right curved wall 24. Substantially L-shaped bracket 550 includes first bracket portion 551 and second bracket portion 552, wherein second bracket portion 552 is substantially perpendicular to first bracket portion 551. Second bracket portion 552 extends outward parallel to rear wall 18. In one embodiment, two bolts will extend through apertures (not shown) in first bracket portion 551 and apertures (e.g., apertures 26, 28 (see FIG. 1)) in vertical left and right curved walls 22, 24. Additionally, two bolts may extend through apertures (not shown) in second bracket portion 552 and through two clips 70 (see FIG. 34) wherein two clips 70 may be used to secure or lock substantially L-shaped brackets 550 to longitudinal and/or transverse wires 42, 44 of cable tray 40. While cable router 510 is shown with two bolts extending through each of first and second bracket portions 551, 552, it will be understood that, in certain aspects fewer than two bolts may be used and in certain aspects more than two bolts may be used.

Substantially L-shaped brackets 550 provide a sufficiently rigid connection of cable router 510 to cable tray 40 such that cable router 510 need not be secured to cable tray 40 using additional brackets or tabs (such as those described in connection with cable routers 10, 110, 310, and/or 410). Accordingly, vertical rear wall 18 need not extend a distance below the ends of left and right ramps 14, 16 as in cable routers 110, 310, and 410. Cable router 510 thus floats above and cantilevers over cable tray 40 and permits cables to be run under cable router 510 without having to feed the cable between the side wall 48 of cable tray 40 and bracket(s) 50 of cable router 10 or vertical rear walls 118, 318, and 418 of cable routers 110, 310, and 410, respectively.

Figure 35:
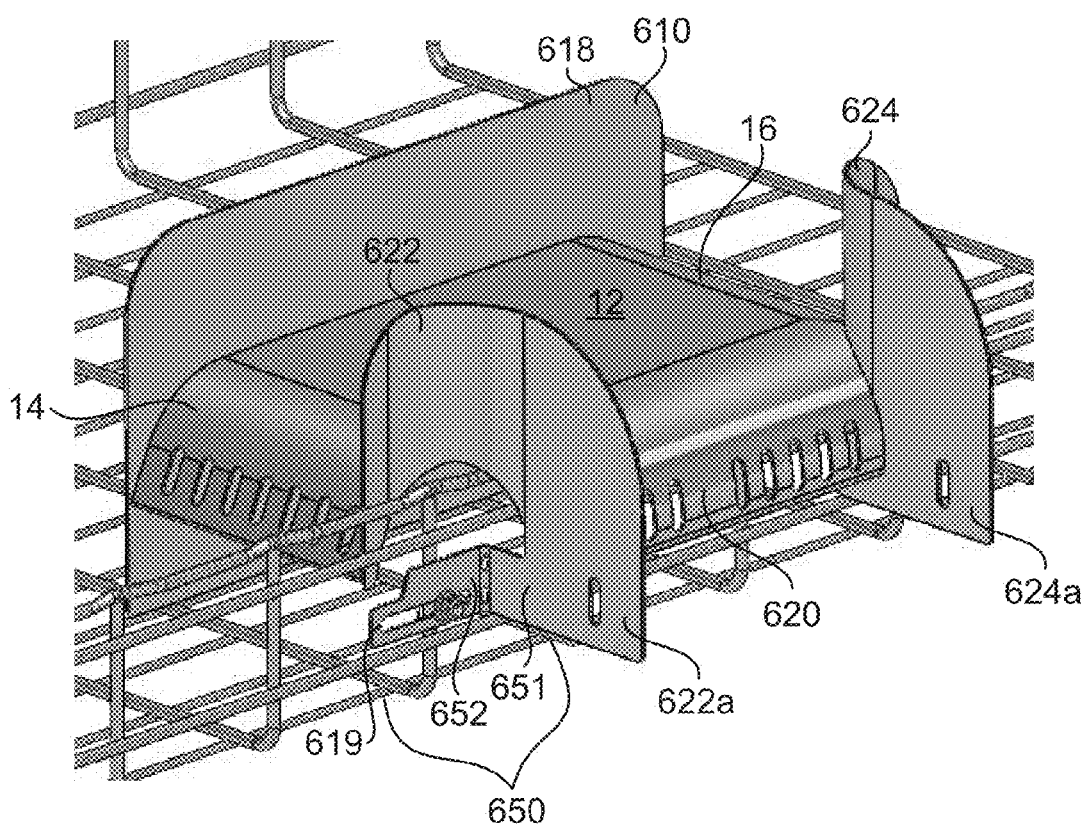
FIG. 35 is a left front perspective view of a cable router affixed to a cable tray according to a seventh aspect of the disclosure.
Figure 36:
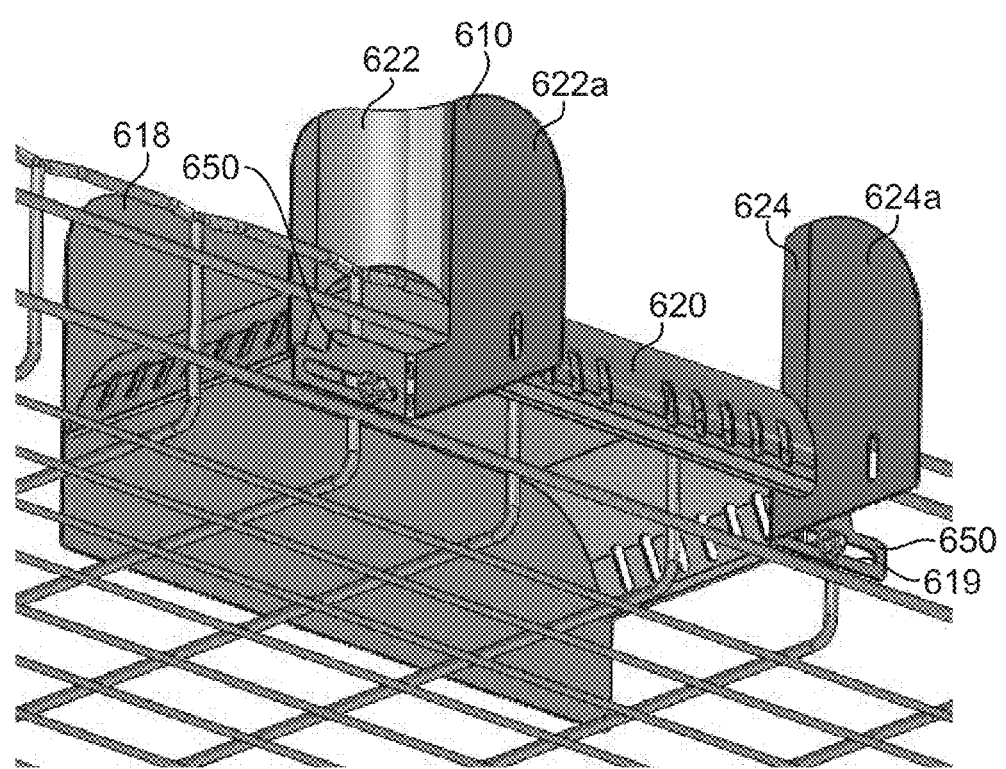
FIG. 36 is a left bottom perspective view of a cable router affixed to a cable tray according to a seventh aspect of the disclosure.

FIGS. 35-36 illustrate yet another aspect of cable router 610. Cable router 610 includes floor 12, left ramp 14, right ramp 16, rear wall 618, front ramp 620, vertical left curved wall 622, and vertical right curved wall 624. Unlike cable router 10, front ramp 620 of cable router 610 does not include brace 20b. However, the front portion of front ramp 620 may curve rearward to reduce or eliminate any sharp edges that could catch or snag cables routed up or down front ramp 620. Vertical rear wall 618 may extend a distance below the ends of left and right ramps 14, 16 such that the bottom edge of vertical rear wall 618 may be located proximate and/or contact bottom portion 46 of cable tray 40 to provide support for cable router 610. Cable router 610 further includes two integrally formed substantially L-shaped brackets 650 (e.g., brackets 650), one each extending from vertical left curved wall 622 and vertical right curved wall 624. Cable router 610 is secured to cable tray 40 using brackets 650.

Each bracket 650, includes first bracket portion 651 and second bracket portion 652, wherein second bracket portion 652 is substantially perpendicular to first bracket portion 651. First portions 622a, 624a of vertical left and right curved walls 622, 624 extend forward along the second direction away from rear wall 18. First bracket portion 651 of each bracket 650 is located proximate the bottom end of each of first portions 622a, 624a of vertical left and right curved walls 622, 624 and extends rearward along the second direction toward rear wall 18. First bracket portion 651 of each bracket 650 is substantially co-planar with each of first portions 622a, 624a of vertical left and right curved walls 622, 624. However, in other aspects it will be understood that first bracket portion 651 may be bent at an angle with respect to first portions 622a, 624a of vertical left and right curved walls 622, 624. The second bracket portion 652 of each bracket 650 extends substantially perpendicular from first bracket portion 651 and outward away from first portions 622a, 624a of vertical left and right curved walls 622, 624. Second bracket portion 652a extends outward parallel to rear wall 18.

In one embodiment, second bracket portions 652 of brackets 650 include elongate substantially horizontal slots 619 through which bolts or other fasteners may extend to secure cable router 610 to cable tray 40. In one embodiment, bolts will extend through slots 619 of second bracket portions 652 and through clips to secure or lock cable router 610 to longitudinal and/or transverse wires 42, 44 of cable tray 40. While cable router 610 is shown with one bolt extending through each second bracket portion 652, it will be understood that, in certain aspects more than one bolt may be used. Prior to tightening of bolts and/or when the bolts are loosened, elongate substantially horizontal slots 619 permit easy adjustment and/or alignment of cable router 610 along the first direction (e.g., the longitudinal direction of cable tray 40). When cable router 610 is located in the desired location on cable tray 40, the bolts are tightened to secure cable router 610 in place. While slots 619 are shown, it will be understood that certain aspects may include other types of apertures, such as holes, without departing from the scope of the current disclosure. For example, in various aspects a population of holes (e.g., about 2, about 3, about 4, about 5, about 6, etc.) may be provided in each second bracket portion 652, wherein the population of holes permit easy adjustment and/or alignment of cable router 610 along the first direction (e.g., the longitudinal direction of cable tray 40).

Figure 37:
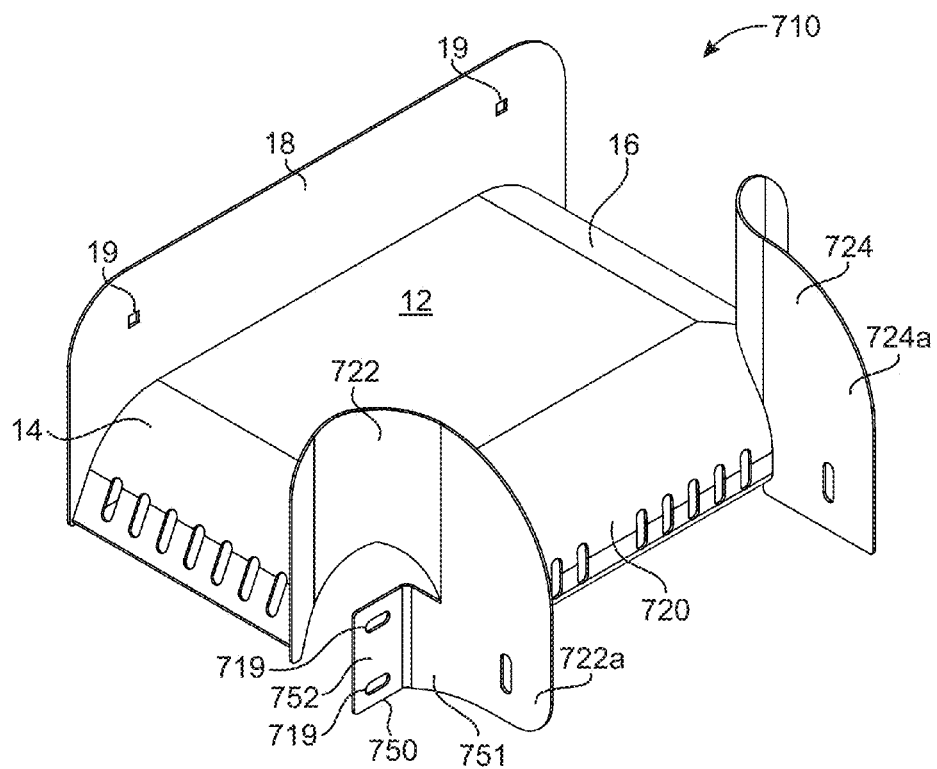
FIG. 37 is a left front perspective view of a cable router according to an eighth aspect of the disclosure.
Figure 38:
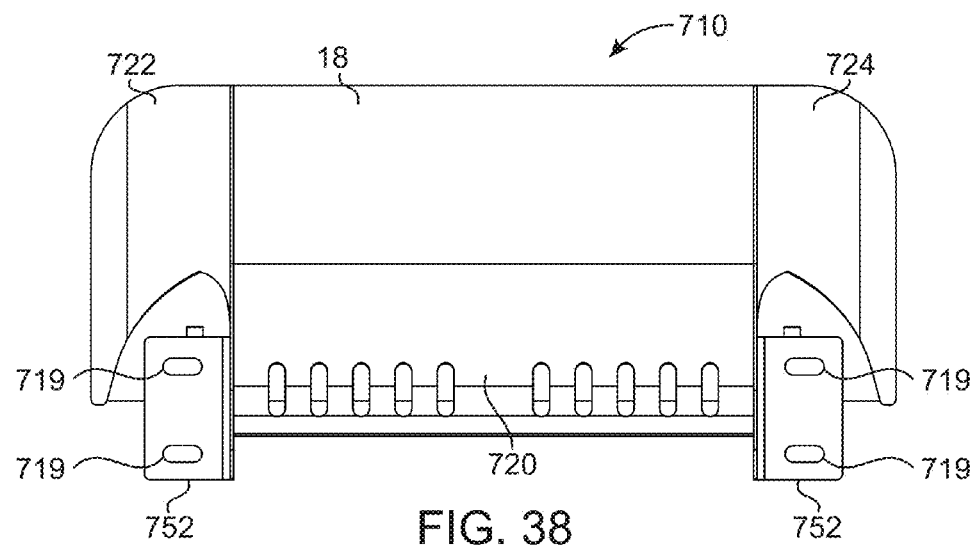
FIG. 38 is a front view of a cable router according to an eighth aspect of the disclosure.
Figure 39:
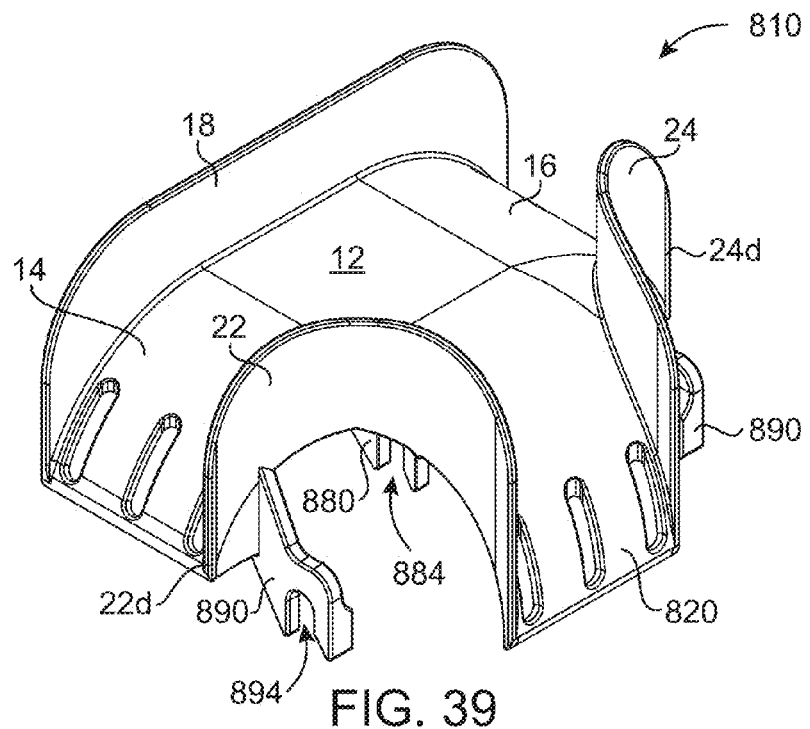
FIG. 39 is a left front perspective view of a cable router according to a ninth aspect of the disclosure.
Figure 40:
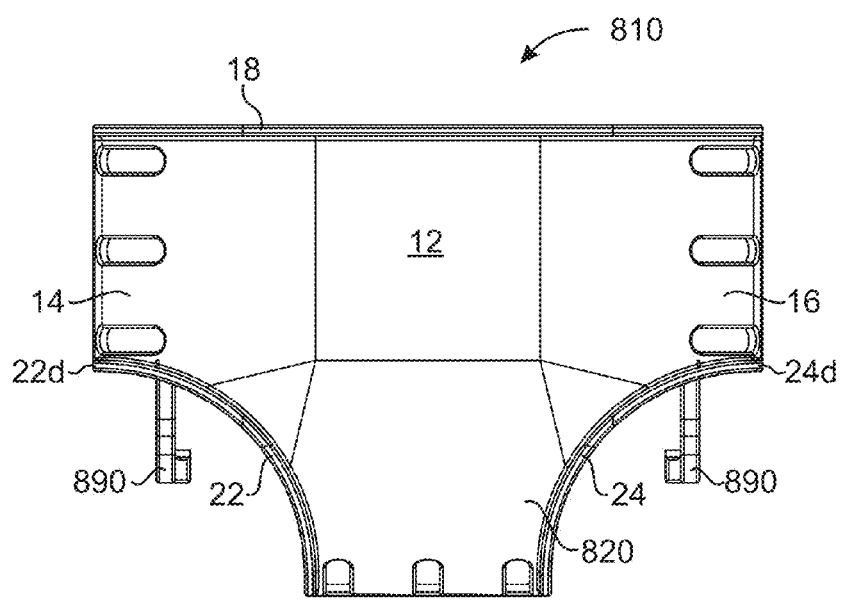
FIG. 40 is a top view of a cable router according to a ninth aspect of the disclosure.
Figure 41:
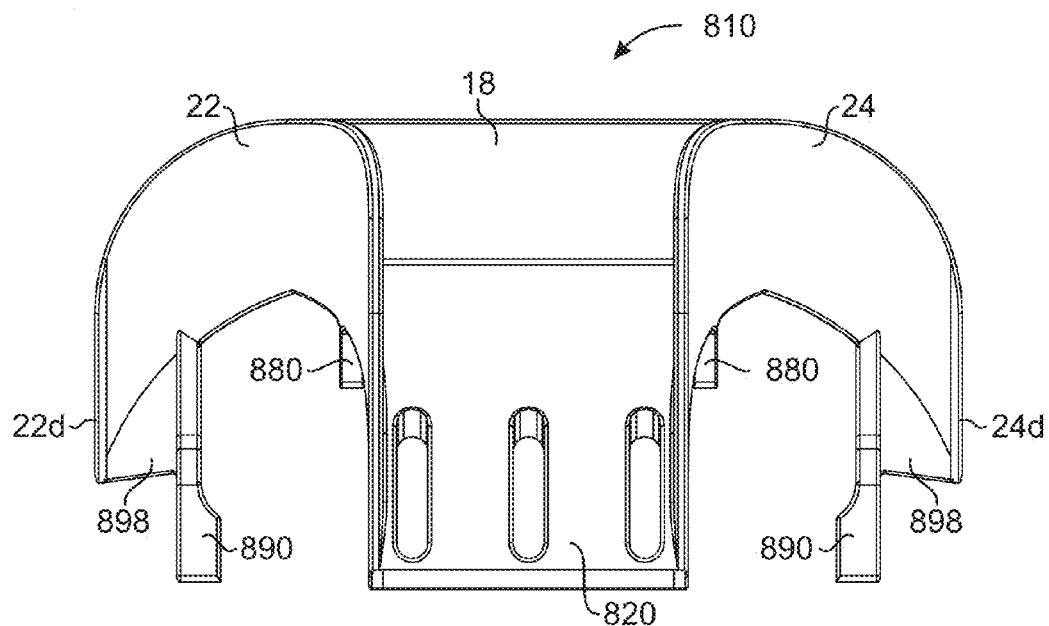
FIG. 41 is a front view of a cable router according to a ninth aspect of the disclosure.
Figure 42:
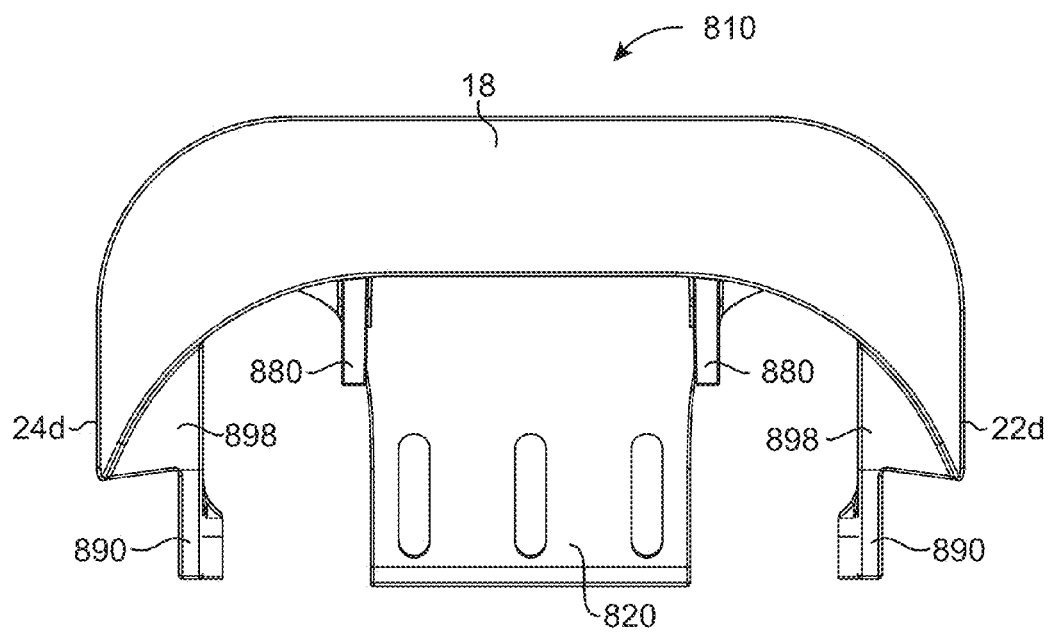
FIG. 42 is a rear view of a cable router according to a ninth aspect of the disclosure.
Figure 43:
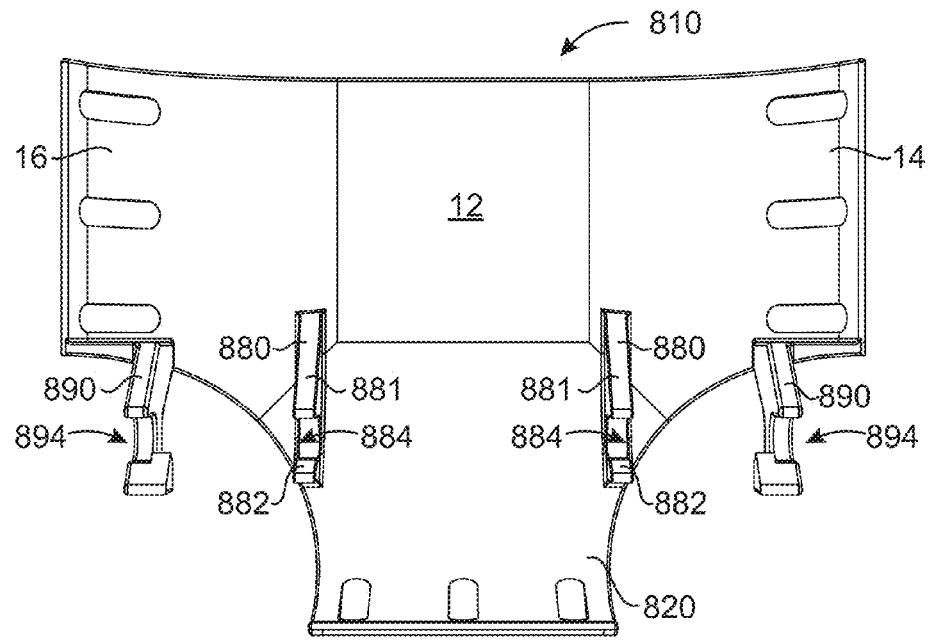
FIG. 43 is a bottom perspective view of a cable router according to a ninth aspect of the disclosure.

FIGS. 37-38 illustrate yet another aspect of cable router 710. Cable router 710 includes floor 12, left ramp 14, right ramp 16, rear wall 18, front ramp 720, vertical left curved wall 722, and vertical right curved wall 724. Unlike cable router 10, front ramp 720 of cable router 710 does not include brace 20b. However, the front portion of front ramp 720 may curve rearward to reduce or eliminate any sharp edges that could catch or snag cables routed up or down front ramp 720. Cable router 710 further includes two integrally formed substantially L-shaped brackets 750 (e.g., brackets 750), one each extending from vertical left curved wall 722 and vertical right curved wall 724. Brackets 750 are a variation of brackets 650 of cable router 610. Cable router 710 is secured to a cable tray 40 using brackets 750.

Each bracket 750, includes first bracket portion 751 and second bracket portion 752, wherein second bracket portion 752 is substantially perpendicular to first bracket portion 751. First portions 722a, 724a of vertical left and right curved walls 722, 724 extend forward along the second direction away from rear wall 18. First bracket portion 751 of each bracket 750 is located proximate the bottom end of each of first portions 722a, 724a of vertical left and right curved walls 722, 724 and extends rearward along the second direction toward rear wall 18. First bracket portion 751 of each bracket 750 is substantially co-planar with each of first portions 722a, 724a of vertical left and right curved walls 722, 724. However, in other aspects it will be understood that first bracket portion 751 may be bent at an angle with respect to first portions 722a, 724a of vertical left and right curved walls 722, 724. The second bracket portion 752 of each bracket 750 extends substantially perpendicular from first bracket portion 751 and outward away from first portions 722a, 724a of vertical left and right curved walls 722, 724. Second bracket portion 752a extends outward parallel to rear wall 18.

In one embodiment, each second bracket portion 752 of brackets 750 includes two elongate substantially horizontal slots 719 through which bolts or other fasteners may extend to secure cable router 710 to cable tray 40. In one embodiment, bolts will extend through slots 719 of second bracket portions 752 and through clips to secure or lock cable router 710 to longitudinal and/or transverse wires 42, 44 of cable tray 40. While cable router 710 is shown with two substantially horizontal slots 719 in each second bracket portion 752, it will be understood that, in certain aspects more than two slots 719 or fewer than two slots 719 may be included. Prior to tightening of bolts and/or when the bolts are loosened, elongate substantially horizontal slots 719 permit easy adjustment and/or alignment of cable router 710 along the first direction (e.g., the longitudinal direction of cable tray 40). When cable router 710 is located in the desired location on cable tray 40, the bolts are tightened to secure cable router 710 in place. While slots 719 are shown, it will be understood that certain aspects may include other types of apertures, such as holes, without departing from the scope of the current disclosure. For example, in various aspects a population of holes (e.g., about 2, about 3, about 4, about 5, about 6, etc.) may be provided in each second bracket portion 752, wherein the population of holes permit easy adjustment and/or alignment of cable router 710 along the first direction (e.g., the longitudinal direction of cable tray 40).

Substantially L-shaped brackets 750 provide a sufficiently rigid connection of cable router 710 to cable tray 40 such that cable router 710 need not be secured to cable tray 40 using additional brackets or tabs (such as those described in connection with cable routers 10, 110, 310, and/or 410). Accordingly, vertical rear wall 18 need not extend a distance below the ends of left and right ramps 14, 16 as in cable routers 110, 310, 410, and 610. Cable router 710 thus floats above and cantilevers over cable tray 40 and permits cables to be run under cable router 710 without having to feed the cable between the side wall 48 of cable tray 40 and bracket(s) 50 of cable router 10 or vertical rear walls 118, 318, 418, and 618 of cable routers 110, 310, 410, and 610 respectively.

FIGS. 39-46 illustrate yet another aspect of cable router 810 wherein cable router 810 snaps or slides on or into cable tray 40. Cable router 810 includes slotted portions which are adapted to receive longitudinal wires 42 of cable tray 40. Cable router 810 is adapted to be used in smaller cable trays and with lighter and/or smaller number of cables, wherein the rigid attachment by brackets, bolts, clips, etc. is not required. For example, cable router 810 may be used to route various wires or cables to an office desk, such as, Ethernet cable(s), power cable(s), audio/visual cable(s), fiber optic cable(s), telephone cable(s).

Cable router 810 includes floor 12, left ramp 14, right ramp 16, front ramp 820, vertical left curved wall 22, vertical right curved wall 24, tabs 880, and arms 890. Unlike cable router 10, front ramp 820 of cable router 810 does not include brace 20b. Cable router 810 is shown with two tabs 880, each having a wire receiving slot 884. Tabs 880 extend or project downward from below floor 12 and/or front ramp 820 in a direction opposite the upward extension or projection of vertical left and right curved walls 22, 24. A wire receiving slot 884 extends substantially vertical upward into each tab 880 and terminates in a semi-circular portion proximate the bottom side of floor 12 and/or front ramp 820. Wire receiving slots 884 are adapted to receive a longitudinal wire 42 of cable tray 40 when cable router 810 is placed on cable tray 40. Tab 880 may further include a tooth (not shown) extending into wire receiving slot 884 which may assist in retaining cable router 810 on cable tray 40. That is, a longitudinal wire 42 of the side wall 48 of cable tray 40 may snap into wire receiving slot 884 where it may be held in place by a tooth.

Stated another way, tab 880 can be described as having a first tab portion 881 and a second tab portion 882 separated a distance to create wire receiving slot 884. First tab portion 881 may be characterized as a right triangular shaped portion extending or projecting downward from below floor 12 and/or front ramp 820 wherein first tab portion 881 tapers in width from the base proximate floor 12 and/or front ramp 820 to a terminal point proximate the bottom of tab 880 and opening of wire receiving slot 884. The right triangular shape of first tab portion 881 assists in providing structural rigidity to tab 880. Second tab portion 882 may be characterized as a finger extending or projecting downward below floor 12 and/or front ramp 820. Second tab portion 882 may additionally include a chamfered or tapered tip portion 882a which serves to widen the entry of wire receiving slot 884 and may permit an increase in the ease with which cable router 810 may be placed on cable tray 40. That is, the chamfered or tapered tip portion 882a of second tab portion 882 may assist in guiding longitudinal wire 42 of cable tray 40 into wire receiving slot 884 of cable router 810.

As shown, cable router 810 includes two tabs 880, a first tab 880 proximate vertical left curved wall 22 and a second tab 880 proximate vertical right curved wall 24. In other aspects, cable router 810 may include less than two tabs 880. For example, a single tab 880 may extend or project downward from below floor 12 and/or front ramp 820 in a direction opposite the upward extension or projection of vertical left and right curved walls 22, 24. Such single tab 880 may be proximate vertical left curved wall 22, may be proximate vertical right curved wall 24, may be located substantially in the middle between vertical left curved wall 22 and vertical right curved wall 24, or at any location therebetween.

In yet other aspects, cable router 810 may include more than two tabs 880 (e.g., about 3 tabs, about 4 tabs, about 5 tabs, about 6 tabs, about 7 tabs, about 8 tabs, about 9 tabs, about 10 tabs, etc.). For example, a first tab 880 may be proximate vertical left curved wall 22, a second tab 880 may be proximate vertical right curved wall 24, a third tab 880 may be located substantially in the middle between first vertical left curved wall 22 and vertical right curved wall 24, and/or additional tabs 880 may be located at any location therebetween.

While tabs 880 are illustrated as thin tabs, in various aspects, tabs 880 may be substantially thicker such that tab 880 may be said to be a solid projection extending downward from below floor 12 and/or front ramp 820 in a direction opposite the upward extension or projection of vertical left and right curved walls 22, 24. Accordingly, the solid projection may extend a thickness in the first direction having a first end proximate vertical left curved wall 22 and a second end proximate vertical right curved wall 24. That is, the solid projection may have a thickness substantially the same as the width of first ramp (see, e.g., $W_F$ in FIG. 2). In such aspects, wire receiving slot 884 may be said to be a wire receiving channel extending through the thickness of the solid projection in the first direction.

In addition to tabs 880, cable router 810 further includes two arms 890, each having a wire receiving slot 894. Arms 890 extend or project at an angle downward and forward from vertical left and right curved walls 22, 24 in the second direction away from rear wall 18. A wire receiving slot 894 extends substantially vertical upward into each arm 890 and terminates in a semi-circular portion. Wire receiving slots 894 are adapted to receive a longitudinal wire 42 of the side wall 48 of cable tray 40 when cable router 810 is placed on cable tray 40. Arm 890 may further include a tooth 896 extending into wire receiving slot 894 which may assist in retaining cable router 810 on cable tray 40. That is, a longitudinal wire 42 of the side wall 48 of cable tray 40 may snap into wire receiving slot 894 where it may be held in place by tooth 896.

Stated another way, arm 890 can be described as having a first arm portion 891 and a second arm portion 892 separated a distance to create wire receiving slot 884. First arm portion 891 extends or projects at an angle downward and forward from vertical left and right curved walls 22, 24 in the second direction away from rear wall 18. Second arm portion 892 may be characterized as an inverted substantially L-shaped finger extending or projecting downward from first arm portion 891. Second arm portion 892 may additionally include a chamfered or tapered tip portion 892a which serves to widen the entry of wire receiving slot 894 and may permit an increase in the ease with which cable router 810 may be placed on cable tray 40. That is, the chamfered or tapered tip portion 892a of second arm portion 892 may assist in guiding longitudinal wire 42 of cable tray 40 into wire receiving slot 894 of cable router 810.

As shown, cable router 810 includes two arms 890, a first arm 890 proximate the terminal end 22d of vertical left curved wall 22 and a second arm 890 proximate the terminal end 24d of vertical right curved wall 24. Cable router 810 may further include a brace portion 898 extending between each arm 890 and the terminal ends 22d, 24d of vertical left and right curved walls 22, 24. Brace portions 898 may provide structural support for arms 890. As shown first and second arms 880 are shown slightly inset from the terminal ends 22d, 24d of vertical left and right curved walls 22, 24; however, it will be understood that in various aspects, first and second arms 890 may be at the terminal ends 22d, 24d of vertical left and right curved walls 22, 24. In one embodiment first and second arms 890 are set at a distance apart wider than the distance between first and second tabs 880. Placing first and second arms 890 wider apart than first and second tabs 880, provides resistance to rotational or rocking motion of cable router 810 in a direction parallel to the transverse direction of cable tray 40.

In other aspects, cable router 810 may include less than two arms 890. For example, a single arm 890 may extend or project at an angle downward and forward from vertical left and right curved walls 22, 24 in the second direction away from rear wall 18. Such single tab 880 may be proximate to or at terminal end 22d of vertical left curved wall 22, may be proximate to or at terminal end 24d of vertical right curved wall 24, may be located substantially in the middle between vertical left curved wall 22 and vertical right curved wall 24, or at any location therebetween.

In yet other aspects, cable router 810 may include more than two arms 890 (e.g., about 3 arms, about 4 arms, about 5 arms, about 6 arms, about 7 arms, about 8 arms, about 9 arms, about 10 arms, etc.). For example, a first arm 890 may be proximate to or at terminal end 22d of vertical left curved wall 22, a second arm 890 may be proximate to or at terminal end 24d of vertical right curved wall 24, a third arm 890 may be located substantially in the middle between terminal end 22d of vertical left curved wall 22 and terminal end 24d of vertical right curved wall 24, and/or additional arms 890 may be located at any location therebetween.

While arms 890 are illustrated as thin arms, in various aspects, arms 890 may be substantially thicker such that arm 890 may be said to be a solid projection that extends or projects at an angle downward and forward from vertical left and right curved walls 22, 24 in the second direction away from rear wall 18. Accordingly, the solid projection may extend a thickness in the first direction having a first end proximate to or at terminal end 22d of vertical left curved wall 22 and a second end proximate to or at terminal end 24d of vertical right curved wall 24. That is, the solid projection may have a thickness substantially the same as the width of cable router 810 in the first direction. In such aspects, wire receiving slot 894 may be said to be a wire receiving channel extending through the thickness of the solid projection in the first direction.

Figure 44:
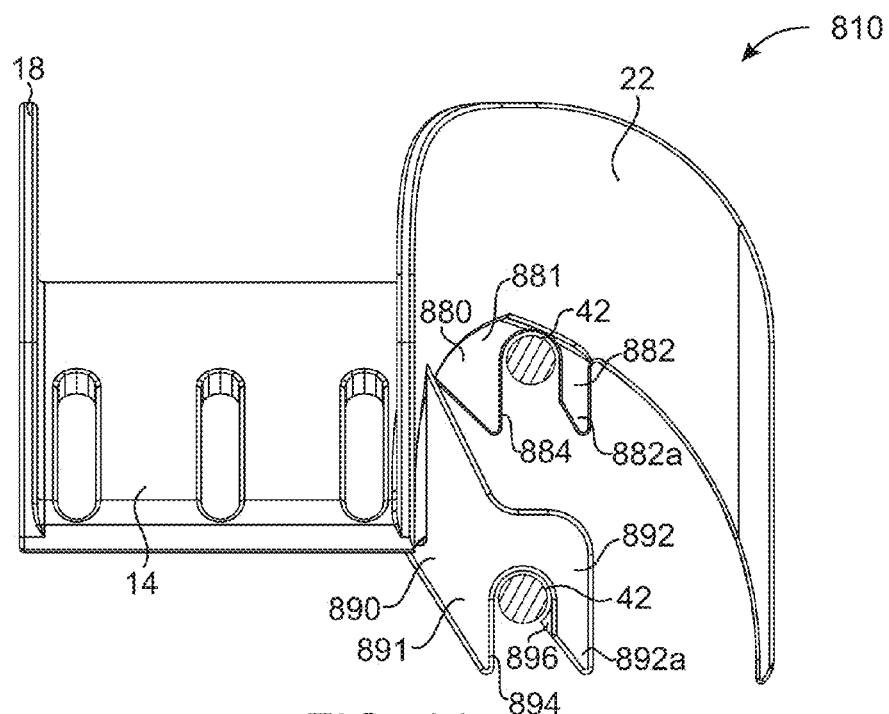
FIG. 44 is a left view of a cable router according to a ninth aspect of the disclosure.
Figure 45:
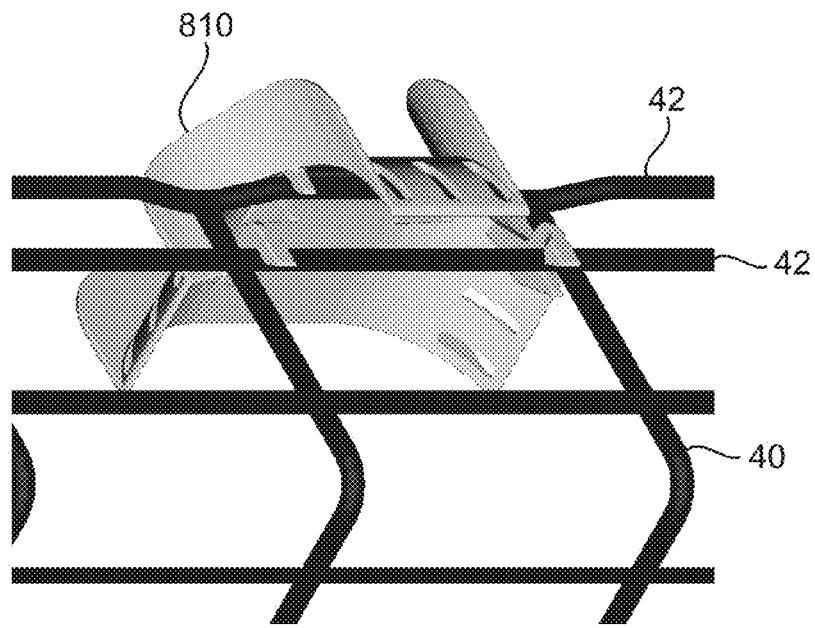
FIG. 45 is a left bottom perspective view of a cable router affixed to a cable tray according to a ninth aspect of the disclosure.
Figure 46:
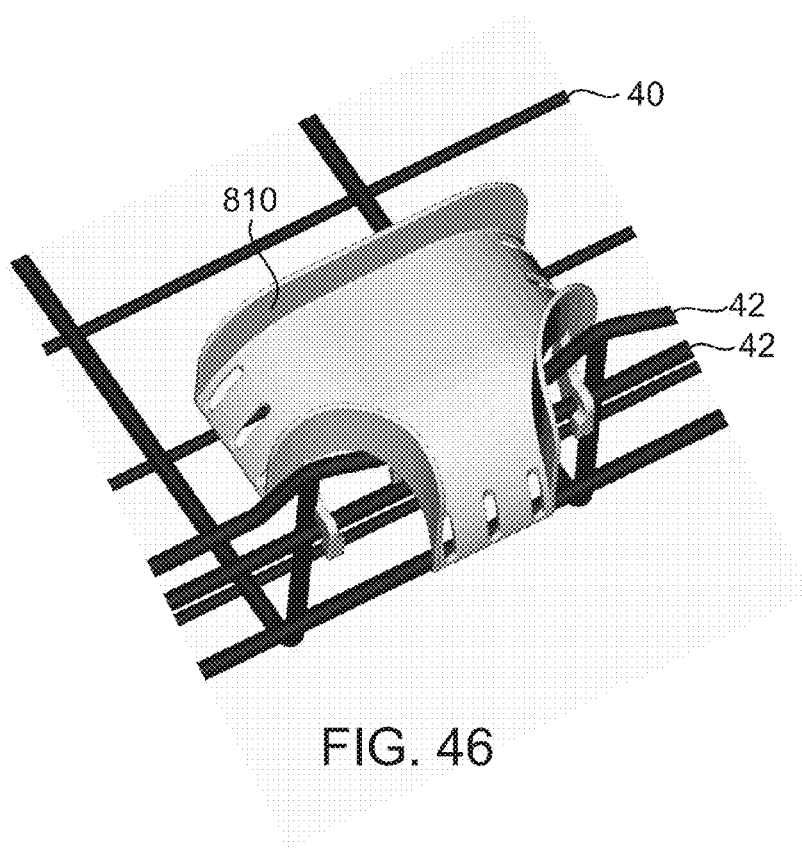
FIG. 46 is a left top perspective view of a cable router affixed to a cable tray according to a ninth aspect of the disclosure.

Now with reference to FIGS. 44-46, wire receiving slots 884, 894 of tabs 880 and arms 890 are closely aligned in the second direction. Wire receiving slots 884 of tabs 880 are positioned slightly further away from rear wall 18 than wire receiving slots 894 of arms 890. This slight offset in alignment of wire receiving slots 884, 894 accommodates cable trays wherein the top longitudinal wire 42 of a sidewall 48 of cable tray 40 is slightly bowed outward as compared to an adjacent lower longitudinal wire 42 of the sidewall 48. In various aspects, however, the centerlines of wire receiving slots 884, 894 of tabs 880 and arms 890 may be coplanar such that there is no offset in the second direction between wire receiving slots 884 of tabs 880 and wire receiving slots 894 of arms 890.

In one embodiment, cable router 810 is used in lighter duty applications as compared to cable routers 10, 110, 210, 310, 410, 510, and 610. In various aspects, cable router 810 may be smaller in size than cable routers 10, 110, 210, 310, 410, 510, and 610. Cable router 810 may be used to carry a small number of cables (e.g., about 1, about 2, about 3, about 4, about 5) and therefore does not need to be large in size and/or does not need to be mounted in cable tray 40 in the manner provided for cable routers 10, 110, 210, 310, 410, 510, and 610. In one embodiment, cable router 810 is constructed of plastic; however, it will be understood that any type of suitable materials, may be used, including, but not limited to, composites (e.g., fiberglass, carbon fiber, etc.), and metals (e.g., steel, stainless steel, aluminum or alloys thereof).

It will be understood that various features of the aspects of cable routers described herein may be used in combination with, or instead of, particular features of another aspect. For example, substantially L-shaped brackets 550, 650, 750 affixed to or integrally formed with vertical left and right curved walls 22, 24, 622, 624, 722, 724 may be used in any aspect of cable routers 10, 110, 210, 310, 410, 510, 610, 710, or 810 without departing from the scope of the disclosure. Additionally, for example, tabs 780 and arms 790 may be used in any aspect of cable routers 10, 110, 210, 310, 410, 510, 610, 710, or 810 without departing from the scope of the disclosure Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. A waterfall-type cable router, comprising:
   a floor having a front side, a rear side, a left side, and a right side, wherein at least a portion of the floor is substantially horizontal;
   a vertical rear wall along the rear side of the floor;
   a left ramp extending downward from the left side of the floor;
   a right ramp extending downward from the right side of the floor;
   a front ramp extending downward from the front side of the floor;
   a vertical left curved wall extending between the left ramp and the front ramp;
   a vertical right curved wall extending between the right ramp and the front ramp; and
   a population of tabs extending downward from the floor and a population of arms extending downward from the vertical left curved wall and the vertical right curved wall, wherein each of the population of tabs and arms include a wire receiving slot.

2. The waterfall-type cable router of claim 1, wherein one or more of:
   a portion of the vertical left curved wall extends forward perpendicular to the vertical rear wall and
   a portion of the vertical right curved wall extends forward perpendicular to the vertical rear wall.

3. The waterfall-type cable router of claim 1, wherein the front ramp has a downward curving portion and a vertical portion extending therefrom.

4. The waterfall-type cable router of claim 3, further comprising a brace extending at a downward angle rearward from the vertical portion of the front ramp.

5. The waterfall-type cable router of claim 4, wherein the brace further comprises a population of notches adapted to rest on one or more wires of a basket-type cable tray.

6. The waterfall-type cable router of claim 1, further comprising a population of holes extending through one or more of the left, right, and front ramps through which fasteners may extend to secure a population of cables to one or more of the left, right, and front ramps.

7. The waterfall-type cable router of claim 1, further comprising a flange extending from a bottom edge of the vertical rear wall.

8. The waterfall-type cable router of claim 1, wherein the vertical left and right curved walls are configured for attachment to a vertical support drop.

9. The waterfall-type cable router of claim 1, wherein one or more of the left and right ramps are hemmed to prevent cables from snagging on the one or more left and right ramps.

10. The waterfall-type cable router of claim 1, wherein the wire receiving slots of the population of tabs and arms are adapted to slide onto one or more wires of a cable tray.

11. The waterfall-type cable router of claim 1, wherein the wire receiving slots of one or more of the population of tabs and arms further comprise a tooth for retaining a wire of a cable tray in the wire receiving slots.

12. The waterfall-type cable router of claim 1, further comprising a substantially L-shaped bracket for securing the vertical left curved wall or the vertical right curved wall to a cable tray.

13. The waterfall-type cable router of claim 12, wherein the substantially L-shaped bracket is integrally formed with the vertical left curved wall or the vertical right curved wall.

14. The waterfall-type cable router of claim 1, further comprising a substantially L-shaped bracket extending from the vertical left curved wall or the vertical right curved wall, the substantially L-shaped bracket having a first bracket portion and a second bracket portion, wherein the first bracket portion extends rearward from the vertical left curved wall or the vertical right curved wall and the second bracket portion extends from the first bracket portion substantially parallel to the vertical rear wall.

15. The waterfall-type cable router of claim 14, further comprising an aperture in the second bracket portion adapted to receive a fastener to secure the cable router to a cable tray.

16. The waterfall-type cable router of claim 1, wherein the cable router is formed of stainless steel.

17. A waterfall-type cable router, comprising:
   a floor having a rear side, a front side, a first side substantially perpendicular to the rear side, and a second side substantially parallel to the first side, wherein at least a portion of the floor is substantially horizontal;
   a vertical rear wall along the rear side of the floor;
   a first ramp extending downward from the first side of the floor;
   a front ramp extending downward from the front side of the floor;
   a vertical first curved wall extending between the first ramp and the front ramp;
   a vertical second wall along the second side of the floor; and
   a population of tabs extending downward from the floor and a population of arms extending downward from the vertical first curved wall and the vertical second wall, wherein each of the population of tabs and arms include a wire receiving slot.

18. The waterfall-type cable router of claim 17 wherein the front ramp has a downward curving portion and a vertical portion extending therefrom.

19. The waterfall-type cable router of claim 18 further comprising a brace extending at a downward angle rearward from the vertical portion of the front ramp.

20. The waterfall-type cable router of claim 19 wherein the brace further comprises a population of notches adapted to rest on one or more wires of a basket-type cable tray.

21. The waterfall-type cable router of claim 17 further comprising a population of holes extending through one or more of the first and front ramps through which fasteners may extend to secure a population of cables to one or more of the first and front ramps.

22. The waterfall-type cable router of claim 17 further comprising a flange extending from a bottom edge of the vertical rear wall.

23. The waterfall-type cable router of claim 17, wherein the vertical first and second walls are configured for attachment to a vertical support drop.

24. The waterfall-type cable router of claim 17 wherein the first ramp is hemmed to prevent cables from snagging on the first ramp.

25. The waterfall-type cable router of claim 17 wherein the first side of the floor is a left side, the second side of the floor is a right side, and wherein the first ramp extends downward from the left side of the floor and wherein the vertical second wall is along the right side of the floor.

26. The waterfall-type cable router of claim 17 wherein the first side of the floor is a right side, the second side of the floor is a left side, and wherein the first ramp extends downward from the right side of the floor and wherein the vertical second wall is along the left side of the floor.

27. The waterfall-type cable router of claim 17, wherein the cable router is formed of stainless steel.

* * * * *